United States Patent [19]

Ward

[11] Patent Number: 4,636,947

[45] Date of Patent: Jan. 13, 1987

[54] ATM TASK SCHEDULING SYSTEM FOR SIMULTANEOUS PERIPHERAL DEVICE TRANSACTIONS PROCESSING

[75] Inventor: Stephen W. Ward, Bedford, Tex.

[73] Assignee: Docutel/Olivetti Corporation, Irving, Tex.

[21] Appl. No.: 589,571

[22] Filed: Mar. 14, 1984

[51] Int. Cl.⁴ .......................... G06F 15/30; G06F 9/00

[52] U.S. Cl. ...................................... 364/200; 235/379

[58] Field of Search ... 364/200 MS File, 900 MS File; 235/379-381, 382

[56] References Cited

U.S. PATENT DOCUMENTS

| | | | |
|---|---|---|---|
| 4,166,945 | 9/1979 | Inoyama | 235/379 |
| 4,249,163 | 2/1981 | Maurer | 235/379 X |
| 4,319,336 | 3/1982 | Anderson et al. | 364/900 |
| 4,321,672 | 3/1982 | Braun et al. | 364/408 |
| 4,438,326 | 3/1984 | Uchida | 235/379 |
| 4,482,058 | 11/1984 | Steiner | 209/534 |
| 4,510,381 | 4/1985 | Fukatsu | 235/379 |
| 4,571,489 | 2/1986 | Watanabe | 235/379 |
| 4,578,567 | 3/1986 | Granzow et al. | 235/380 |
| 4,593,183 | 6/1986 | Fukatsu | 235/379 |

*Primary Examiner*—Archie E. Williams
*Attorney, Agent, or Firm*—Harold E. Meier

[57] ABSTRACT

A method and apparatus are provided for reducing customer transaction time in an automated teller machine (ATM) having various peripheral devices associated therewith. Each peripheral device associated with the ATM; e.g. a card handler mechanism, a printer mechanism, one or more cash dispenser mechanisms, and a depository mechanism, include a dedicated processor and memory for controlling the operation of the peripheral device connected thereto. The ATM also includes a peripheral control unit connected to the various subsystem controllers and to an ATM control unit for receiving generated transaction sequence event messages and in response thereto concurrently processing the messages to initiate simultaneous real-time operation of the various peripheral devices. For example, the concurrent processing of transaction sequence event messages allows completion of the card ready activity, entry of a customer PIN and printing of the customer receipt header to take place simultaneously. This parallel activity of the peripheral devices reduces the elapsed time for a customer to complete an ATM transaction.

16 Claims, 9 Drawing Figures

ATM TASK SCHEDULING SYSTEM FOR SIMULTANEOUS PERIPHERAL DEVICE TRANSACTIONS PROCESSING

TECHNICAL FIELD

The present invention relates to automated teller machines (ATMs) and more specifically to a method and apparatus for reducing ATM customer transaction time.

BACKGROUND OF THE INVENTION

Automated teller machines (ATMs) are well-known in the prior art. Since their development in 1969, such machines have been utilized by banking institutions to perform various customer banking transactions, such as cash withdrawals, transfers, balance inquiries, deposits, payments, and other routine financial transactions. Typically, an ATM includes a customer interface which contains the unit's card handler, transaction display and keyboard, cash dispenser, depository and printer. In operation, a customer inserts an encoded magnetic stripe card into a card slot of the card handler to initiate a transaction. After the validity of the card is checked, the customer is prompted through the transaction display to select a transaction via the keyboard. The transaction display and keyboard thereafter guide the customer through one or more selected transactions. At the end of certain transactions; e.g., cash withdrawal, currency may be dispensed via the cash dispenser. Normally, a customer receipt describing the transaction is printed for the customer's permanent records.

In the early years of their development; i.e., 1969–1976, ATMs were only somewhat commercially successful although they provided a major advantage to customers—banking functions 24 hours a day, seven days a week. During this time, the majority of ATM installations were made through-the-wall at a bank's main office, and were accessed by cardholding customers standing outside the office. However, this picture changed drastically around 1977 when ATMs became less expensive to manufacture and more reliable. About this time, financial institutions also realized that they could install machines remotely at a lesser expense than was required to build new branches. With the existence of remotely-located ATMs, customers were provided the added benefit of being able to perform banking functions at several locations throughout an area. Unsurprisingly, lines behind ATMs became as long or longer than those at the teller windows. Moreover, in recent years financial institutions have located ATMs at still more convenient customer locations, such as shopping malls and grocery stores.

Although ATM use has increased dramatically since the machines were first introduced in 1969, the basic terminal has remained remarkably unchanged. It is true that currently produced machines are less costly and more reliable than their predecessors due to technological advancements in the data processing and automation industries; however, it is also true that such machines still process transactions in the same manner as the first generation ATMs. Specifically, prior art ATMs have always operated their peripheral devices; i.e., the card handler, printer, depository, etc., in a sequential fashion. For example, when initiating a transaction, a customer is prompted to enter a personal identification number (PIN), which then needs to be verified for security reasons. During the time period that the ATM is communicating with a host device to validate the customer PIN, the main processing unit of the ATM is effectively "idle"; i.e., it is not processing any other task. As another example, to print a customer receipt following a cash withdrawal transaction, the main processing unit in the ATM sends a print command and associated print data to the printer mechanism. However, during the time that the printer is activated to print the data, the main processing unit is again put on "hold," waiting for an acknowledgement that the data has been printed. Further, it is only after the processor receives printing confirmation that it initiates control commands to the cash dispenser to effect the dispensing of currency to the customer.

This sequential processing of ATM input/output functions has reduced the efficiency of such machines by increasing overall customer transaction time. Moreover, with the increased availability and use of ATMs, lengthy transaction time is transformed into longer waiting lines for customers. These lines are of course a major concern for financial institutions and customers, many of whom utilize ATMs to avoid waiting at the teller windows. There is therefore a need to provide an improved ATM which has the capability of reducing customer transaction time.

SUMMARY OF THE INVENTION

Accordingly, the present invention is directed to a method and apparatus for reducing the time required to complete an ATM transaction. Generally, such reduction is achieved through utilization of "smart" or intelligent peripherals associated with the ATM and a novel task handling system. As used herein, the term "peripheral" refers to the various input/output devices used with the ATMs; e.g., the card handler, printer, cash dispenser, etc. Each of the peripheral devices includes a subsystem controller having a dedicated processor and memory for facilitating parallel transaction event processing among the devices. As used herein, "transaction events" refers to those events which occur during a transaction; e.g., "Asking for PIN," "Transaction Selection," "Dispense Cash," etc. In accordance with the present invention, the sequence of events that occur during a transaction may be altered by the financial institution through modification of a Transaction Sequence Table stored in the operating system of the ATM.

Specifically, the method and apparatus of the present invention separates transaction events into two groups: a command/request event group and a response/status event group. The method of activating parallel activity of the peripheral devices is to initiate as many command/request events as possible before following them in the Transaction Sequence Table with their corresponding response/status events, such events causing a "wait state" to occur during the transaction. For example, after a card is detected by the card handler mechanism, the ATM may simultaneously perform the following command/request events: printing header information on the customer receipt, retrieving card data from the encoded magnetic stripe and requesting the customer to enter his/her personal identification number. Likewise, after PIN entry and validation, and transaction selection and host authorization, the ATM may perform the following command/request events simultaneously: printing the transaction description on the print receipt and dispensing currency. Therefore, since the command/request and response/status events occur simultaneously, overall customer transaction time is reduced.

In the preferred embodiment, an ATM for performing various customer transactions is provided in conjunction with an ATM controller communicating with a host device. The ATM controller may be one of various types: an ATM control unit (ACU) designed to provide the processing and communications necessary for a single terminal operating in an on-line fashion, or a local/remote ATM controller supporting on-line and off-line fallback features for 1-8 locally-attached ATMs and up to 16 remote ACU-based terminals. To facilitate parallel event processing, each of the peripheral devices associated with the ATM includes a peripheral subsystem controller including a dedicated processor and memory. Each ATM includes a peripheral control unit (PCU), also incorporating a dedicated processor and memory, connected to each peripheral subsystem controller and the ATM controller. The PCU is used to interface communications between a chosen ATM controller and the appropriate ATM peripheral device. Specifically, the memory of the PCU includes one or more communications protocol handler tasks for controlling data formatting and timing between devices communicating in an on-line network.

In accordance with an important feature of the present invention, software routines are provided for enabling concurrent processing, by the dedicated processors of the PCU or ACU, of messages from the peripheral devices. As used herein, the term "message" is used to denote a string of characters including both control characters and data characters. For example, to initiate a print operation, the processor in the ACU will format a print message including control characters designating a specific printer, and data characters incorporating the message to be printed. This message is then "sent" via an ACU communications protocol handler task to the PCU of the ATM, where the message is passed to a communications protocol handler task therein. Subsequently, the message is transmitted to the printer subsystem controller where it is used to control the printer.

To reduce transaction time, the various processors in the peripheral controller subsystem operate simultaneously, with the processor in the PCU operating on a time-shared basis. Specifically, each of the subsystem processors maybe used to format or receive messages to initiate transaction events with respect to their respective peripheral device. However, messages received by the PCU are queued onto a linked list for a respective task and transferred to the ATM controller on a first-in, first-out basis. Therefore, processing of the messages in the PCU is done concurrently, whereas the processors in the various peripheral subsystem controllers operate in a truly simultaneous fashion, thereby providing simultaneous real-time operation of the peripheral devices associated with the ATM.

According to another important feature of the present invention, a real-time, multi-tasking operating system is provided in the PCU and ACU which is accessed through a set of primitive system commands. As used herein, the term "multi-tasking" refers to the capability of more than one task being able to share the same instruction set (i.e., the same code) concurrently. "Task" refers to the various system processes which control the operation of the ATM: e.g., both the ACU and the PCU include upper and lower level communications protocol handler tasks for handling communications between the various device interfaces. Also, to control the transaction sequence, the ACU includes a transaction sequence handler task. Other tasks, such as a keyboard handler task and a maintenance panel task are also provided to facilitate control of the ATM. The PCU includes a first implementation of the multi-tasking operating system, referred to as MTS or multi-tasking sequencer, which provides non-prioritized scheduling of tasks. Under this implementation, each task has an equal opportunity to run. In MTS operation, all tasks in the PCU are placed in a linked list, and when one task suspends itself, the next task in the list has an opportunity to run. The former task will not be given another opportunity to run until all other tasks have been given an oppotunity. The ACU includes a second implementation of the multi-tasking operating system, referred to as MTX or multi-tasking executive, which provides prioritized task scheduling. Unlike MTS, there is no single linked list of all tasks. In contradistinction, in MTX several priority queues are defined, one queue for each priority level. When a task needs to run, but a higher priority task controls the ACU processor, the former task is queued to the priority queue corresponding to its priority. This task will run when all higher priority tasks and all equal priority tasks on the same queue suspend themselves. Conversely, if the task's priority is greater than the currently running task, then the latter task is preempted and the former is resumed.

The multi-tasking operating system in the PCU handles multiple input/output requests to facilitate simultaneous input/output processing of event messages through the individual "intelligent" subsystem controllers. Likewise, the operating system of the ACU services communications to the host device and multi-tasking input/output requests to, and responses from, the peripheral devices connected to the PCU.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
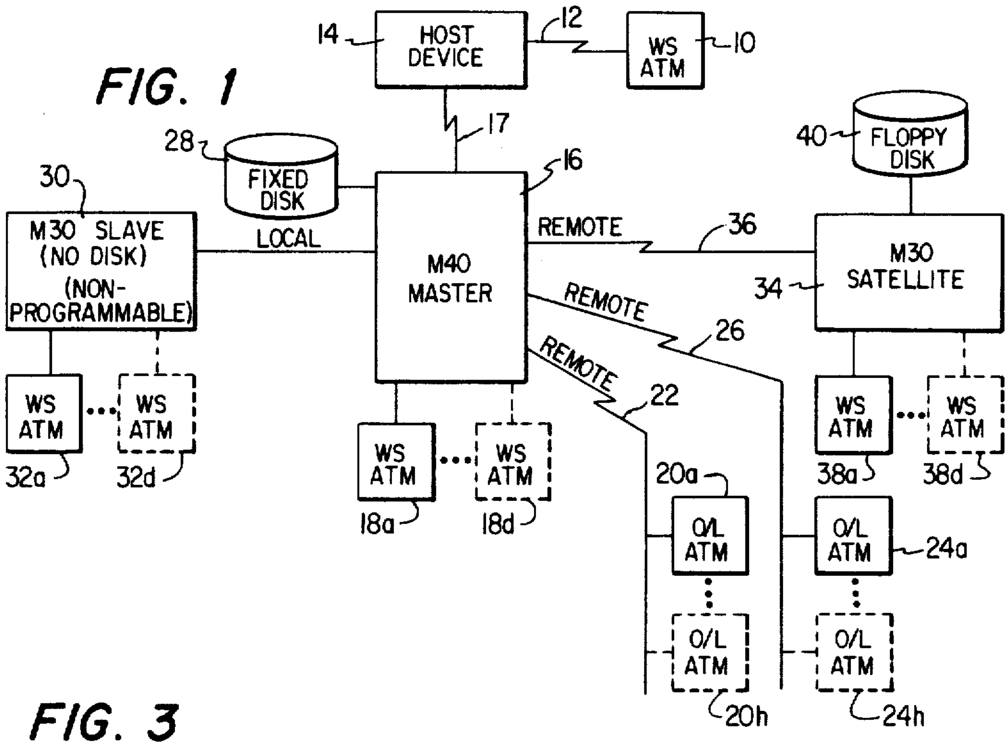
FIG. 1 is a block diagram of a system configuration incorporating a plurality of ATM terminals and various ATM controllers connected to a host device.

Referring now to the figures wherein like reference characters designate like or similar elements, FIG. 1 is a block diagram of a representative ATM system configuration. In FIG. 1, an automated teller machine work station (WS) 10 is shown connected directly through a communication link 12 to a host device 14. As will be described in more detail below, the ATM 10 includes an ATM controller (or ACU) for controlling the operation of the ATM 10 on a 1:1 basis. Alternatively, ATMs are connected to the host device through a master controller 16 connected to the host device 14 through a communications link 17. In such a network, 1 to 4 work station (WS) ATMs, 18*a*–18*d*, are connected locally to the master controller 16. Also, one or more sets of off-line ATMs, such as 20*a*–20*h*, are remotely connected to the master controller 16 through the communications link 22. Another set of off-line ATMs, 24*a*–24*h*, are remotely connected to the master controller 16 through the communications link 26. The master controller 16 includes a fixed disk storage 28 for supporting routines utilized to control communications between the various ATM devices and the host device 14.

As also shown in FIG. 1, the master controller 16 is locally connected to a slave controller 30 which is itself locally connected to 1 to 4 work station ATMs 32*a*–32*d*. Alternatively, a satellite controller 34 is remotely connected to the master controller 16 via the communications link 36 and includes 1 to 4 work station ATMs 38*a*–38*d*. The satellite controller 34 includes a floppy disk 40 for additional storage. Throughout the remainder of this description, the various ATM controllers 16, 30 and 34 will be referred to for convenience as "other ATM controllers" to distinguish such devices from the ACU, which as noted above serves to control the operation of a single on-line only ATM. It should be appreciated that the system configuration shown in FIG. 1 is exemplary only and is used only to represent the various configuration possibilities available through the use of the ACU and other ATM controllers. Many factors must be considered to design an ATM network, including on-line versus off-line fallback operation, geographic location, the number of ATMs at a site, file storage, and communications and throughput requirements. As represented in FIG. 1, various controller, communication and feature options permit numerous configuration possibilities for a user of the ATM of the present invention.

Figure 2:
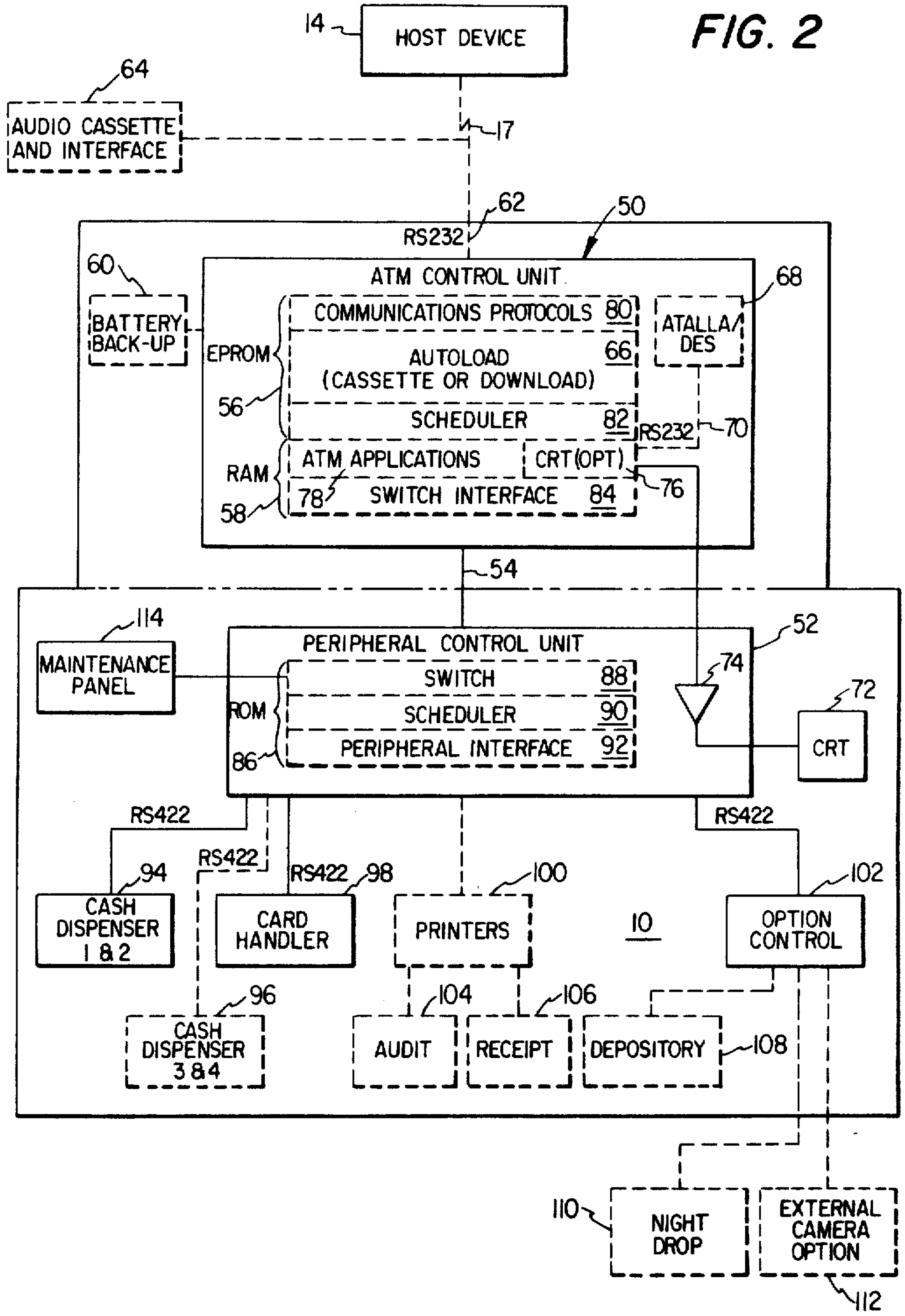
FIG. 2 is a block diagram of one of the on-line only ATMs shown in FIG. 1.

Referring now to FIG. 2, a block diagram is shown of one of the on-line only ATMs of FIG. 1. As seen in FIG. 2, the ATM includes two primary control units, the ATM Control Unit (ACU) 50 and the Peripheral Control Unit (PCU) 52. The ACU 50, which serves as the intelligence for processing all customer and teller transactions, is locally connected, via an RS422 asynchronous serial full-duplex interface line 54 within the ATM 10, to the PCU 52, and remotely connected to the host device 14 through the communication link 17. The ACU 50 is a microprocessor-based controller with 80K bytes of memory. Specifically, the first 8K bytes of the ACU memory is an erasable programmable read-only memory (EPROM) 56 with the remaining 72K bytes being a random access memory (RAM) 58. All RAM memory is supported by the battery backup 60, which ensures that all transaction, accounting, and statistical related data will not be lost during a power failure. As also seen in FIG. 2, the ACU 50 includes an RS232 port 62 to allow connection thereof to the host device 14, or alternatively to one of the ATM controllers described with respect to FIG. 1, or to an audio cassette and interface box 64 for program loading. Specifically, programs may be loaded into memory using an autoload portion 66 of the EPROM 56 via an audio cassette or through downline operation from the host device 14. In operation, an audio cassette is placed in the audio cassette and interface box 64 which serves to convert the audio data on the cassette to RS232 data, or to convert the RS232 data to audio data to write a cassette. To load a program via the audio cassette and interface box 64, the host communications cable must be removed so the audio cassette cable can be connected to the RS232 port 62.

Typically, the ACU 50 includes an Atalla Identikey™ Security and/or Data Encryption Standard (DES) circuit 68 for local PIN validation. The circuit 68 is connected to the RAM 58 via a RS232 asynchronous serial full-duplex interface link 70. The ACU 50 also directly controls a cathode ray tube (CRT) display 72 via signals buffered by an amplifier 74 in the PCU 52. This control is provided by a routine stored in a CRT portion 76 of the RAM 58.

According to an important feature of the present invention, the software architecture in the ACU 50 has been "layered," i.e., the applications system software is separated from the operating system software. As seen in FIG. 2, a portion 78 of the RAM 58 in the ACU 50 is dedicated to the ATM applications system software while the operating system software is stored in a communications protocol portion 80 and a scheduler portion 82 of the EPROM 56. The RAM 58 also includes a PCU switch interface portion 84. The separation of the applications system software from the operating system software allows for the modification of transaction sequences, display messages, print formats and card capture criteria, without the necessity of altering the operating system software. The actual physical interfaces to the PCU 52 and peripheral devices connected thereto will be transparent to the ATM applications system software 78. In addition, the operating system software layers are not affected by changes to application code or reconfiguration with a different communications protocol. Moreover, according to an important feature of the present invention, the scheduler portion 82 of the operating system includes a multi-tasking kernel which functions to service communications to the host device 14 and multi-tasking input/output requests to, and responses from, peripheral devices connected to the ACU 50 and the PCU 52, to faciliate parallel processing of transaction sequence events. This portion of the operating system software will be described in more detail below.

The EPROM 56 includes a communications protocol portion 80 for storing a communications handler task for handling communications between the ACU 50 and the host device 14, while the switch interface 84 supports a second task for handling communications between the ACU 50 and the PCU 52. The communications handler task for facilitating communications between the ACU 50 and the host device 14 provides for all protocol and interrupt handling of messages therebetween. The protocols that can be supported are: IBM 3270, 2260, SDLC/SNA and 3600 Loop; Burroughs TC500/700, NCR 270; Honeywell 765 and Univac U100. Such protocols have been described in the prior art and a detailed description thereof is believed unnecessary to provide a complete understanding of the present invention. As noted above, a communications handler task is also provided for handling the interface between the ACU 50 and the PCU 52.

In operation, although the interface between the ACU and the PCU is full-duplex, transmission normally takes place in a half-duplex mode. All characters transmitted contain 11 bits; a start bit, 8 data bits, a parity bit, and a stop bit. If both the ACU 50 and the PCU 52 indicate simultaneously that they have data to transmit, the ACU gives priority to the PCU and enters a receive mode. The ACU will again attempt to transmit its frame of data at the completion of the PCU transmission sequence.

The use of the EPROM 56 in the ACU 50 to store the communications protocols as well as the remainder of the operating system is advantageous since it allows the ATM to fully communicate with the host device without the need for program loading in random access memory.

Referring back to FIG. 2, the peripheral control unit 52 includes a read-only memory 86 for storing routines in a switch portion 88, a scheduler portion 90 and a peripheral interface portion 92. Switch portion 88 of ROM 86 supports the upper level communications protocol handler task (for ACU/PCU communications) while peripheral interface portion 92 supports the lower level communications protocol handler task (for PCU/peripheral communications). According to an important feature of the present invention, the scheduler portion 90 includes the operating system software for implementation of multi-tasking. In particular, this portion of the PCU 52 includes a multi-tasking kernel for providing non-prioritized scheduling of tasks associated with the ATM. As noted above, the scheduler portion 82 of the EPROM 56 in the ACU 50 includes a multi-tasking kernel for providing prioritized task scheduling. As will be discussed in more detail below, this capability facilitates the parallel processing of transaction events according to the method and apparatus of the present invention.

The peripheral control unit (PCU) 52 serves as a software multiplexer for the logical input/output request link to physical input/output device subsystem controllers. In particular, in the preferred embodiment the PCU 52 has seven input/output ports for connecting up to seven different input/output peripheral devices.

Referring to FIG. 2, the ATM 10 includes (a) first and second, and (b) third and fourth cash dispenser subsystem controllers 94 and 96, respectively, a card handler subsystem controller 98, a printer subsystem controller 100, and an option subsystem controller 102. Two of the input/output ports of the PCU 52 are utilized by the cash dispenser subsystem controllers 94 and 96, with the remaining input/output ports utilized by the card handler subsystem controller 98, the printer subsystem controller 100 and the option subsystem controller 102, an optional smart depository (not shown) and a spare. Each one of the subsystem controllers is connected to the PCU 52 through a RS422 asynchronous serial full-duplex interface link. As indicated by the dotted line representation in FIG. 2, the cash dispenser subsystem controller 96 is optional, as is the printer subsystem controller 100, which is connected to an adult printer 104 and a receipt printer 106. The option subsystem controller 102 is connected to a optional depository 108, a night drop box 110 and an external camera option 112. The option subsystem controller 102 provides a control monitor interface for these various optional devices.

In accordance with an important feature of the present invention, each of the subsystem controllers 94–102 include a dedicated processor and memory for controlling peripheral devices associated with the ATM. For example, the card handler subsystem controller 98 includes a dedicated processor, such as a Z80 microprocessor, for controlling a card handler mechanism associated with the ATM. Likewise, the printer subsystem controller 100 includes a dedicated microprocessor for controlling one or more printers associated with the ATM. As will be described in more detail below, the PC 52 also includes a dedicated processor for concurrently processing transaction sequence event messages from the various subsystem controllers 94–102 and the ACU to provide simultaneous functioning in real-time of two or more of the peripheral devices associated with the ATM 10. This simultaneous functioning of the peripheral devices increases the efficiency of the ATM 10 by reducing customer transaction time.

As discussed above, the scheduler portion 90 of the operating system includes a multi-tasking kernel which serves to manage the tasks that pass messages between the ATM applications 78 in the ACU 50 and the device subsystem controllers 94–102. As also noted, the switch portion 88 of the ROM 86 stores an upper level ACU/PCU communications protocol while the peripheral interface portion 92 stores a lower level communications protocol for interfacing the PCU 52 and the various device subsystem controllers 94–102. The interface between the PCU and the device controllers is full-duplex, although transmission normally takes place in a half-duplex manner. All characters transmitted contain 11 bits; a start bit, 8 data bits, a parity bit and a stop bit. If both the PCU and a dedicated processor in one of the subsystem controllers indicate simultaneously that they have data to transmit, the PCU gives priority to the processor and enters a receive mode. The PCU will again attempt to transmit its frame of data at the completion of the device transmission sequence. Finally, as noted in FIG. 2, the ATM 10 includes a maintenance panel 114 which includes a maintenance panel keyboard used to initiate certain service functions. Functions available via the maintenance panel include date, time and transaction serial number entry, performance report generation, the running of test transaction, equipment tests, and receipt "heading" maintenance.

Figure 3:
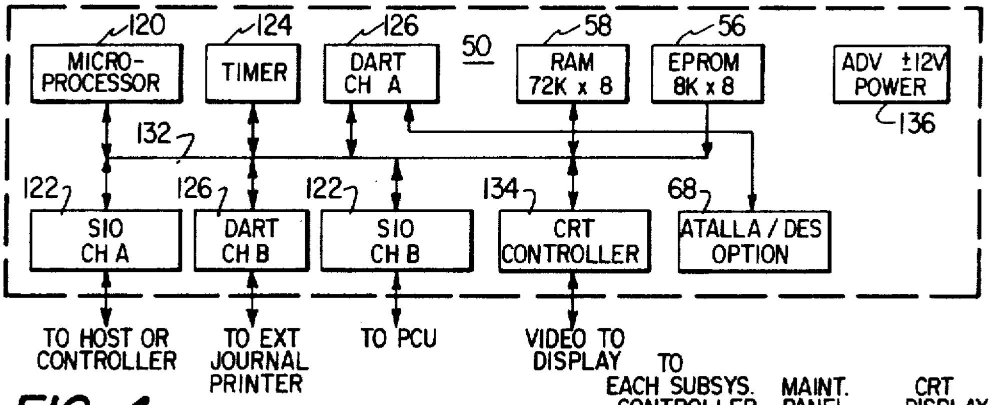
FIG. 3 is a schematic block diagram of the ATM controller (ACU) for the on-line ATM shown in FIG. 2.
Figure 4:
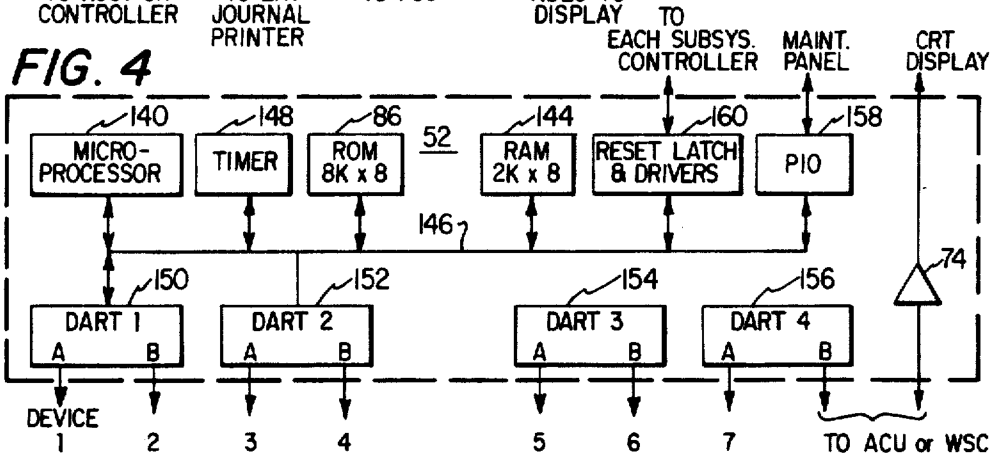
FIG. 4 is a schematic block diagram of the peripheral control unit (PCU) of the ATM shown in FIG. 2.
Figure 5:
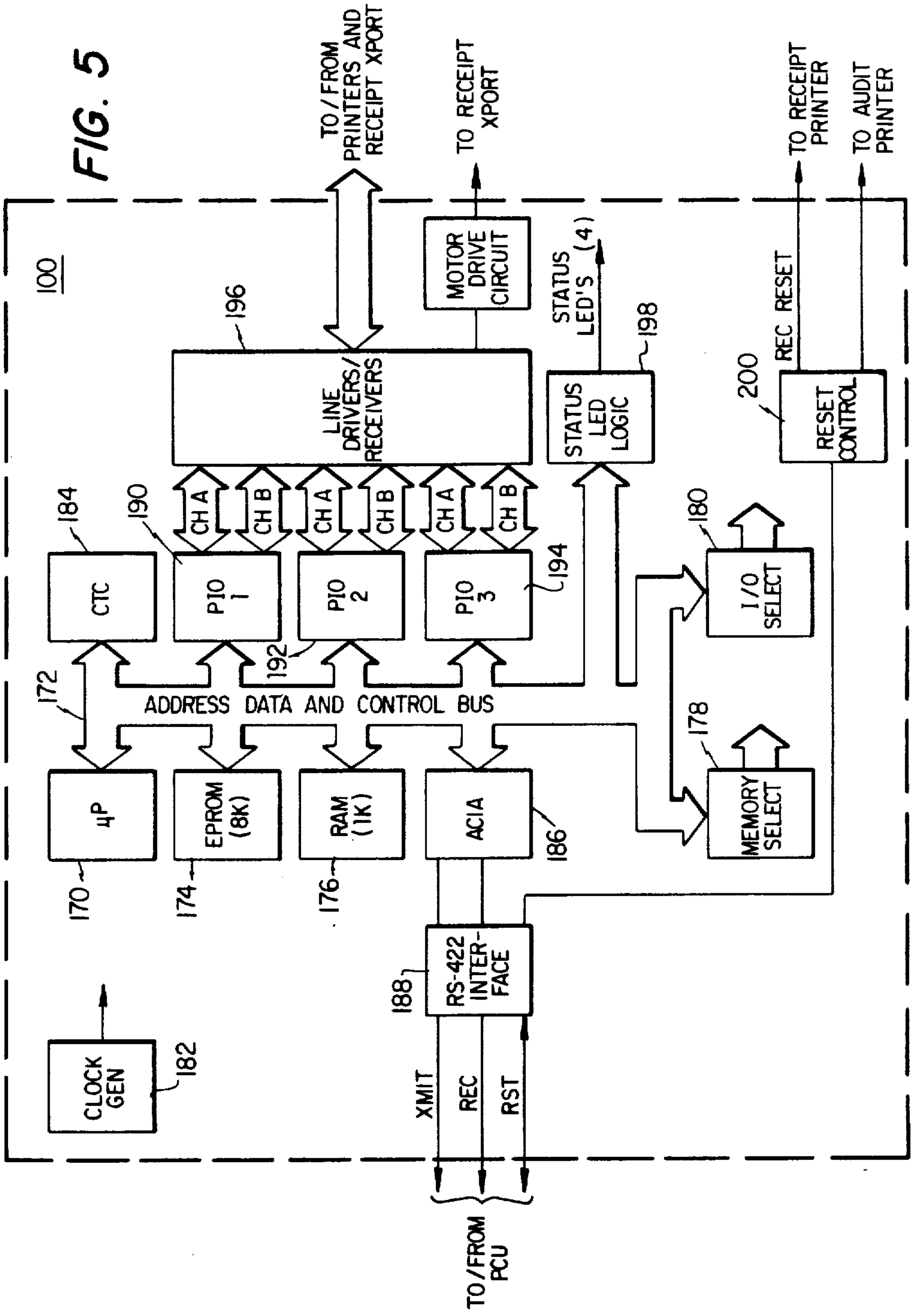
FIG. 5 is a schematic block diagram of the printer subsystem controller used to control the printer in the ATM of FIG. 2.

Referring now to FIGS. 3–5, block diagrams are provided showing the hardware details of the ACU 50, PCU 52 and the printer subsystem controller 100, respectively, of FIG. 2. Specifically, FIG. 3 shows the details of the ACU 50, which as noted above performs the general system control functions for the on-line only ATM. The ACU's control activities are based upon communications with either a host device or a work station controller as discussed above with respect to FIG. 1. The ACU 50 includes a dedicated microprocessor 120 for controlling the ATM's operations via the ACU's communications interfaces. Specifically, a host-/modem interface is accomplished via channel A of serial input/output (SIO) controller 122. The host-/modem interface is a full-duplex, RS232 serial interface which operates at selectable baud rates. The interface port's baud rate clock is supplied either from an on-board generated clock from timer 124 (selectable baud rate), or from an external baud-rate clock (modem driven), dependent upon the system's protocol requirements. The serial input/output controller 122 operates under the control of the microprocessor 120 to provide a means to transfer data and commands to and from the host/modem and the microprocessor 120.

The ACU/PU communications interface is accomplished via channel B of SIO controller 122. This interface is a full-duplex, differential RS422 compatible interface operating at 9600 baud for both transmit and receive functions. The ACU 50 also includes a dual asynchronous receiver/transmitter circuit 126 (DART), channel A of which is connected to the system's Atalla/DES circuit 68. As discussed above with respect to FIG. 2, this interface is a full-duplex RS232 interface operating from the 9600 baud-clock for both receive and transmit functions. Channel B of the DART 126 serves as an external printer interface to support the system's optional external journal printer from a full-duplex, serial RS232 port. Moreover, to support the ATM operational/control functions of the microprocessor 120, the ACU includes 80K bytes of main-program memory. In particular, 72K bytes of random access memory are provided as represented by the reference numeral 58. Also, 8K bytes of an erasable programmable read-only memory (EPROM) are provided as represented by the reference numeral 56. As discussed above with respect to FIG. 2, the communication line protocols and autoload, as well as other operating system software are located in the EPROM 56. Although not specifically shown in FIG. 3, the ACU also maintains memory-support circuitry, main-memory select/enable logic as well as special memory select/enable logic, for allowing the microprocessor 120 to perform control, address and data transfer functions from the memory devices utilizing the microprocessor's 16-bit address bus, 8-bit data bus and 13 control/function lines, represented generally by the bus 132. Additionally, the ACU 50 includes a cathode ray tube (CRT) controller 134 which contains 2K bytes of RAM addressable by the microprocessor 120 sharing the top 2K of address space with the RAM 58. This memory must be specially selected by the microprocessor 120 and is used for character codes. The ACU 50 also includes a ±12 volt power supply 136 for the RS232 requirements.

The ACU 50 of FIG. 3 performs a number of control and communication functions. Specifically, ACU 50 maintains a dedicated host communications interface capable of operating at selectable speeds in a full-duplex configuration. Additionally, the ACU 50 supports a variety of synchronous and asynchronous host communications protocols and, as discussed above, accepts both automatic and operator-initiated program autoload functions either downline from a host device or locally from the audio cassette and interface 64. Moreover, the ACU provides screen-display character data for the ATM's CRT display. As an important feature of the present invention, the ACU 50 controls and monitors the high-level operations of the ATM's functional peripheral devices via its serial RS422 peripheral control unit interface.

Referring now to FIG. 4, a block diagram of the peripheral control unit 52 of the FIG. 2 is shown in detail. In particular, the PCU 52 includes a microprocessor 140 which controls the general operations of the PCU 52 while operating from software routines stored within 8K bytes of read-only memory 86. In addition, the microprocessor 140 has access to 2K bytes of random access memory 144 which provides temporary data storage and data buffer functions for the microprocessor program execution. The microprocessor 140 maintains an 8-bit data bus, a 16-bit address bus and 13 control-function lines, represented generally by the bus 146. The PCU 52 also includes a timer circuit 148 for providing the PCU clock and the 9600 baud rate clock for the communication interface circuits. Specifically, the PCU 52 maintains 4 dual asynchronous receiver/transmitter (DART) devices 150, 152, 154 and 156. As seen in FIG. 4, each of the DART devices maintains 2 data channels (channels A and B) with each channel capable of independent transmit and receive functions. Therefore, each DART provides a serial transmit and a serial receive communications interface for up to two of the ATM's peripheral devices as discussed above with respect to FIG. 2. Note that channel B of DART 156 provides a communications interface to the ACU 50 of FIG. 3 as well as the interface to the subsystem controller for peripheral device No. 7. In particular, channel B of DART 156 is connected to channel B of the SIO controller 122 shown in FIG. 3. Alternatively, channel B may be connected to one of the other ATM controllers as discussed above with respect to FIG. 1.

In operation, data transmissions to peripheral device subsystem controllers and the ACU (or other ATM controller) are initiated by the microprocessor 140 selecting the appropriate DART device that provides the interface for communications to the desired device. Once the DART is selected, the microprocessor proceeds to enable the necessary control/function lines and data is then transferred to the DART from the microprocessor. The DART proceeds to input the data and convert it to a serial data stream through which it is transferred to the appropriate device subsystem controller or the ACU (or other ATM controller).

As also seen in FIG. 4, the PCU 52 includes the amplifier 74 and associated circuitry for buffering the CRT control signals provided by the CRT controller 134 of FIG. 3. The PCU 52 also includes a parallel input/output controller (PIO) 158 for providing an interface to the maintenance panel. Finally, the PCU 52 includes a reset latch and driver circuit 160 for providing power-on-reset control functions.

Generally, the PCU 52 functions as a data concentrator for communications between the ATM's ACU 52 (or other ATM controller), and the ATM's device subsystem controller ports. Additionally, the PCU performs data concentrator functions for communications between the ACU and the maintenance panel, as well as performing receive/buffer/retransmit functions for the CRT display signals received from the ACU.

Referring now to FIG. 5, a block diagram is provided for the printer subsystem controller 100 of FIG. 2. As noted above, according to a feature of the present invention each of the peripheral device subsystem controllers include a dedicated processor and memory for facilitating parallel transaction event processing to reduce customer transaction time. To this end, the printer interface subsystem controller 100 includes a Z80 microprocessor 170 for controlling and monitoring the general operations of a receipt printer 106 and an optional audit printer 104 as described above with respect to FIG. 2. The microprocessor 170 maintains a 16-bit addrress bus, an 8-bit data bus and 13 control/function lines as represented generally by the reference numeral 172. These bus and control lines are used to effect the communications, address, input/output selection and command functions required to control the printer subsystem. The microprocessor 170 has access to 9K bytes of memory configured as 8K bytes of EPROM 174 and 1K bytes of RAM 176. Memory selection functions are accomplished by the microprocessor 170 through a memory select circuit 178 connected thereby by the bus 172. Input/output selection functions are accomplished by an input/output selection circuit 180 also connected to the microprocessor 170 via the bus 172.

The printer subsystem controller 100 system clock is provided by the clock generator 182 and a counter/timer controller circuit 184 is utilized to establish counter/timer functions for the microprocessor 170 and an asynchronous communications interface adapter (ACIA) circuit 186. Data and command communications to and from the counter/timer controller 184 and the microprocessor 170 are accomplished via the bus 172. The ACIA circuit 186 provides the communications interface between the subsystem controller 100 and the PCU 52 described above with respect to FIG. 4. This interface is configured for full-duplex operation; however, data transmissions typically occur in a half-duplex mode. As discussed above, the ACIA circuit 186 provides data formatting and control functions for all communications via the RS422 interface 188.

The printer subsystem controller 100 includes three parallel input/output (PIO) controller devices 190, 192 and 194 for providing an input/output interface between the subsystem controller 100 and the receipt printer, audio printer and a receipt transport mechanism. Each of the PIO devices consists of two 8-bit ports (channels A and B) operating under control of the microprocessor 170. Data transfers to and from the PIO devices 190, 192 and 194 and the microprocessor 170 are accomplished via the data bus 172. As seen in FIG. 5, the PIO devices are connected to and from the printers and receipt transport via the line driver/receiver circuit 196. Finally, the printer interface subsystem controller 100 includes a status LED logic circuit 198 having a plurality of status LEDs used to report the status of the system power-up and reset functions. Specifically, the interface controller power-on-reset functions, and other reset functions are provided by the reset control circuit 200.

In operation, the microprocessor 170 of the printer subsystem controller 100 controls the general operations of the printer subsystem. The communications interface between the printer subsystem controller and the ACU 50 (or other ATM controllers) initiates printer activities, provides variable receipt and audit data such as transaction type, dollar amounts, etc., and monitors printer status. As discussed above, the PCU 50 serves as a data concentrator for communications between the printer subsystem and the ACU or other ATM controller.

Although not shown in detail, it should be appreciated that the other subsystem controllers of FIG. 2, such as the cash dispenser subsystem controllers 94 and 96, card handler subsystem controller 98 and option subsystem controller 102, include similar microprocessor, memory and input/output circuitry as the printer subsystem controller of FIG. 5. In particular, each of these subsystem controllers include a dedicated processor and memory for formatting and receiving messages to and from the ACU 50 (or other ATM controller) to facilitate parallel transaction event processing according to the method and apparatus of the present invention.

Figure 6:
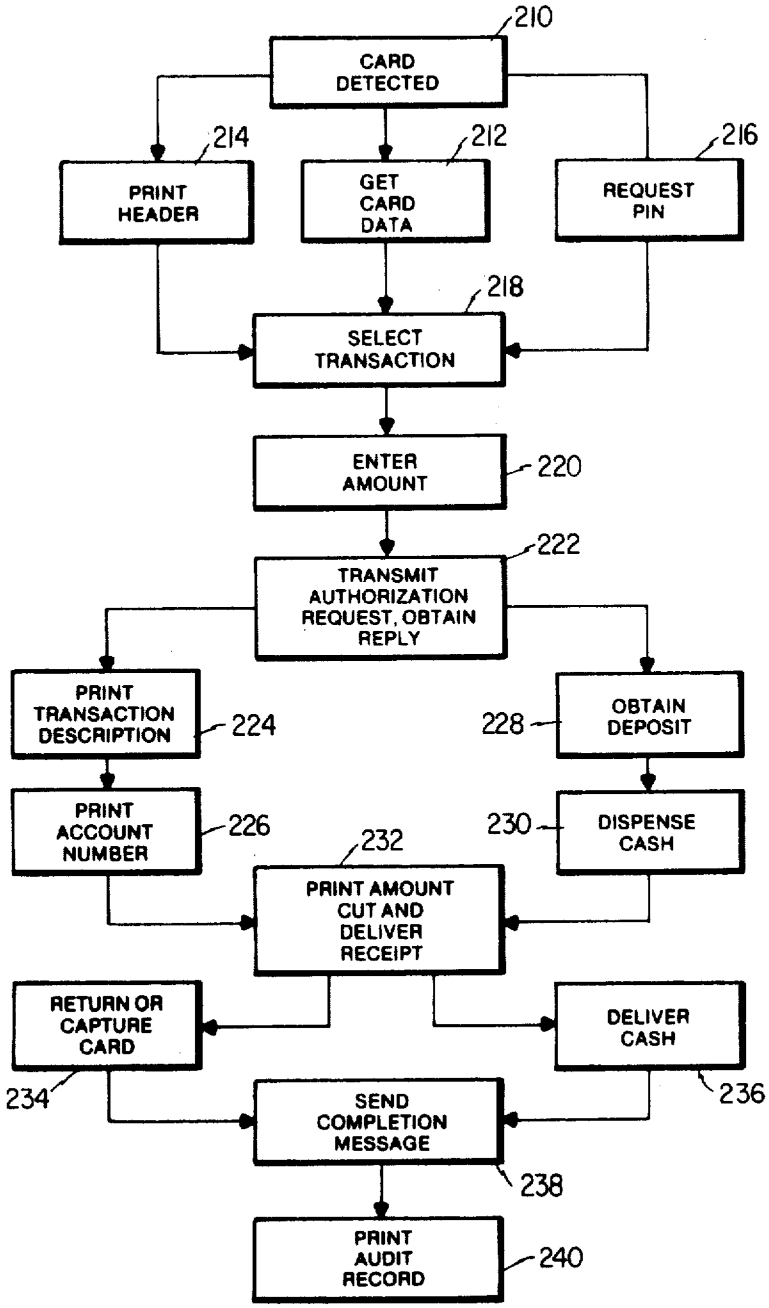
FIG. 6 is a flow chart diagram of a typical transaction sequence according to the method and apparatus of the present invention.

Referring now to FIG. 6, a flow chart of a typical transaction sequence is provided according to the method and apparatus of the present invention. In the past, the peripheral devices associated with an automated teller machine have typically been operated in sequential fashion. For example, when initiating a transaction, a customer would enter a personal identification number (PIN) which would then be verified for security reasons. Such verification required the ATM to communicate with a host device, during which time the main processing unit of the ATM was effectively "idle". The main processing unit of the ATM was likewise put on "hold" during other portions of the transaction sequence. As another example, to print a customer receipt following a cash withdrawal transaction, the main processing unit in the ATM would send a print command and associated print data to the printer mechanism associated with the ATM. However, during the time that the printer was activated to print the data, the main processing unit was again put in a "wait state, " waiting for the acknowledgement that the data had been printed. Further, only after the processor received printing confirmation would it initiate a control command to the cash dispenser, for example, to effect the dispensing of money to the customer.

Such sequential processing of ATM input/output functions is inefficient since it increases overall customer transaction time. This problem is ameliorated by the method and apparatus of the present invention by ordering transaction sequence events to maximize parallel activity of the various peripheral devices associated with the ATM.

In particular, a Transaction Sequence Table describing the sequence of events that can occur during a transaction is set forth below:

TABLE I

TRANSACTION SEQUENCE TABLE

| EVENT NO. | DESCRIPTION |
|---|---|
| 1 | Print Customer Receipt Header |
| 2 | Customer Receipt Status |
| 3 | Get Card Data |
| 5 | Ask for PIN |
| 6 | Wait for PIN |
| 7 | Transaction Selection |
| 8 | Customer Detail Print (transaction record data) |
| 9 | Card Rewrite |
| 11 | Ask for Deposit |
| 12 | Wait for Deposit |
| 13 | Dispense |
| 14 | Wait for Card Handler Status |
| 15 | Trailer/Cut Status |
| 17 | Ask for Multiple Transactions |
| 18 | Wait for Multiple Transactions Response |
| 20 | Card Return Capture |
| 21 | Customer Trailer/Cut |
| 24 | Completion Message |
| 26 | Audit Detail Print (transaction record data) |
| 27 | Audit Status |
| 28 | Journal Detail Print (transaction record data) |
| 29 | Journal Status |
| 30 | Wait for Depository |

The above Table I is preferably stored in the ATM applications portion 78 of the RAM 58 in the ACU 50 of FIG. 2. In this way, a user (the financial institution) may modify the Transaction Sequence Table to maximize the amount of parallel peripheral device activity. Such modification may also be accomplished downline by messages sent from the host device.

Referring simultaneously now to FIGS. 2 and 6, such ordering of the Transaction Sequence Table to maximize parallel activity is diagrammed. In particular, when the transaction sequence handler task stored in the ATM applications portion 78 of the ACU 50 receives notification from the card handler subsystem controller 98 that a card has been taken in, as represented by reference numeral 210, this task requests the card data from the card handler. As seen in FIG. 6, the card data is then transferred to the transaction sequence handler task as represented by reference numeral 212. Simultaneously, the transaction sequence handler task formats a "print header" message and sends this message to the printer subsystem controller 10 to print customer header information on the customer receipt. This function is represented by the reference numeral 214. Moreover, the sequence handler task also formats a message to request the card holder to enter his/her personal identification number (PIN), such message being shown on the CRT display 72. This request is shown by the reference numeral 216.

Therefore, according to the method of the present invention, the transaction sequence handler task initiates a plurality of transaction sequence events through messages transmitted to and received from the individual peripheral device subsystem controllers. Parallel processing of such messages is facilitated by the dedicated processors in the individual peripheral subsystem controllers.

As soon as the PIN entry is complete, the PIN is verified by the Atalla/DES circuit 68 in the ACU 50 or remotely through the host device. The transaction sequence handler task next causes a transaction display menu to be displayed on the CRT to facilitate customer selection of a transaction. Such selection is represented by the reference numeral 218 in FIG. 6. If an amount is required, it is then chosen by the customer from a menu display or entered one digit at a time as represented by the reference numeral 220. Following the transmission of an authorization request from the ACU to the host device, and the obtaining of a reply therefrom as represented by the reference numeral 222, several parallel transaction events are initiated. In particular, a transaction descriptor, such as "Withdrawal From Savings," and the effective account number are printed on the customer receipt as represented by the reference numerals 224 and 226, respectively. Simultaneously, the ATM can accept a deposit envelope in the depository or dispense cash into a cash dispenser as represented by the reference numerals 228 and 230, respectively. As discussed above, such parallel activity is facilitated through the use of the "intelligent" subsystem controllers which control the various peripheral devices associated with the ATM. Following the activities 224, 226, 228 and 230, the last line of the customer receipt (whose header was printed in step 214 and transaction descriptor in step 224) is then printed, and the customer receipt is cut and delivered as indicated by reference numeral 232. Following this step, another sequence of parallel events can occur; specifically, the return/capture of the user card and the actual delivery of cash to the user from the dispenser, as represented by the steps 234 and 236, respectively. Once it is determined that the customer has successfully obtained his money and/or receipt, a completion message is transmitted to the host device as represented by the step 238. Following this step, an audit record is printed for the institution's record.

As can be seen above with respect to the discussion of FIG. 6, the method and apparatus of the present invention for reducing ATM customer transaction time involves parallel processing of transaction events. More specifically, according to the present invention various transaction events are paired and separated into first and second event groups. In particular, those transaction events which request certain transaction information from the customer or command a peripheral device to perform a function are placed in the first event group, titled the command/request group. Other transaction events, specifically those which cause a "wait state" in the transaction sequence to occur are placed in the second event group, titled the response/status events. The following table lists paired events:

TABLE II

| PAIRED TRANSACTION SEQUENCE EVENTS | |
|---|---|
| FIRST EVENT OF PAIR | SECOND EVENT OF PAIR |
| 5 Ask for PIN | 6 Wait for PIN |
| 8 Customer Detail Print | 2 Customer Receipt Status |
| 9 Card Rewrite | 14 Card Handler Status |
| 11 Ask for Deposit | 12 Wait for Deposit |
| 17 Ask for Multiple Transactions | 18 Wait for Multiple Transaction Response |
| 20 Card Return/Capture | 14 Card Handler Status |
| 21 Customer Trailer/Cut | 15 Trailer/Cut Status |
| 26 Audit Detail Print | 27 Audit Status |
| 28 Journal Detail Print | 29 Journal Status |

As can be seen in Table II, the second event of the pair must occur somewhere in the transaction sequence after the first event, but not necessarily immediately following the first event. The method and apparatus of the present invention utilizes this fact to initiate as many command/request events as possible before following them in the Transaction Sequence Table with their respective response/status events, which as noted above cause a "wait state" to occur during the transaction sequence processing. For example, the following order in the Transaction Sequence Table allows completion of the card read activity, entry of the PIN, and printing of the customer receipt header to take place simultaneously:

TABLE III

1. Print Customer Receipt Header
5: Ask for PIN
3: Get Card Data
6: Wait for PIN
2: Get Customer Receipt Status Alternatively, the following order establishes a single thread sequence, because no activity is initiated until the previous activity is completed:

TABLE IV

3: Get Card Data
5: Ask for PIN
6: Wait for PIN
1: Print Customer Receipt Header
2: Get Customer Receipt Status As shown in FIG. 6, some transaction sequence events are required to logically precede others, for example, the PIN entry and PIN wait states must precede transaction selection. Additionally, since the completion message transmission status and card capture/- return status are printed on the audit record, an audit detail event should follow them in the sequence table.

Figure 7:
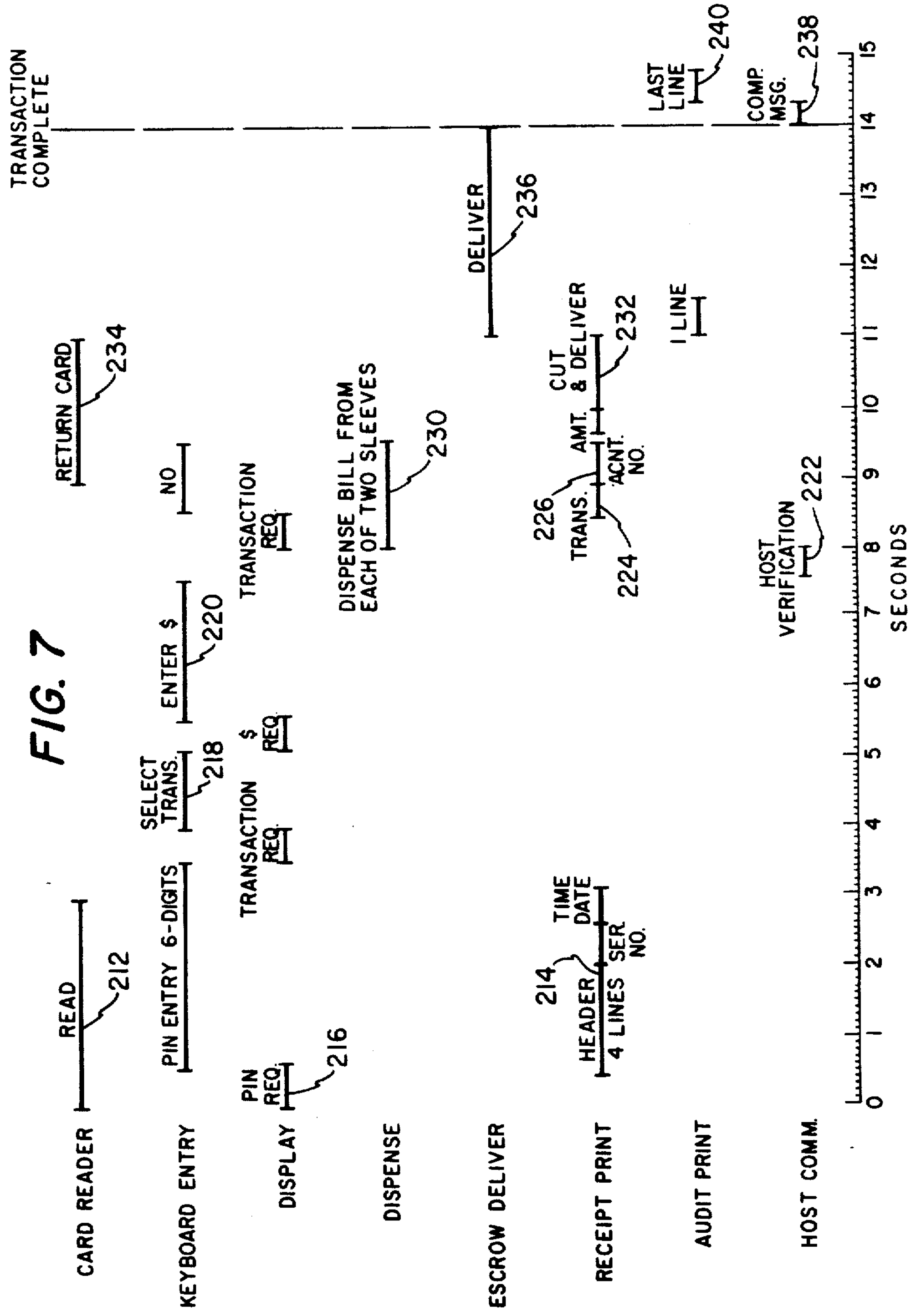
FIG. 7 is a chart showing how the method and apparatus of the present invention reduces customer transaction time in an automated teller machine.

Referring now to FIG. 7, a chart is shown showing how the parallel processing of transaction sequence events in FIG. 6 reduces customer transaction time. In particular,the graph FIG. 7 shows the various input-/output functions represented on the vertical axis versus transaction speed as represented in seconds on the horizontal axis. Note that the reference numerals utilized to describe the steps in FIG. 6 have been incorporated into FIG. 7. As can be seen in FIG, 7, steps 212, 214 and 216 are accomplished within the first 3.5 seconds of the transaction, with transaction and amount selection, steps 218 and 220, being accomplished within 7.5 seconds of the beginning of the transaction. Following host verification in step 222, the transaction events 224, 226, 228 and 230 are completed within 10 seconds of the beginning of the transaction. Following printing and delivery of the customer receipt in step 232, the card return and cash delivery steps 234 and 236 are completed at about the 14 second mark. Therefore, the ATM of the present invention has a transaction speed of less than or equal to approximately 15 seconds for a two bill dispense (one bill from each dispenser) withdrawal. Of course, any external delays associated with the host computer and communication links would increase this transaction time. This 15 second turnaround is based on the on-line only system configuration and the existence of a semi-experienced operator. However, it should be appreciated that the method and apparatus of the present invention substantially reduces customer transaction time as compared to prior art automated teller machines.

As has been described above with respect to FIG. 2, the present invention also provides a unique software architecture wherein the software has been "layered," separating the ATM applications system software from the operating system software. This separation allows for the local or downline modification of the Transaction Sequence Table stored in the random access memory of the ACU. Moreover, the distribution of intelligence throughout the ATM; i.e., the use of subsystem controllers each having a dedicated processor and memory permits multiple peripheral devices associated with the ATM to function simultaneously. For example, FIG. 7 shows that PIN entry may overlap the printing of header information at the receipt station and the reading of magnetic stripe data. With the ability to modify the Transaction Sequence Table to produce such parallel processing of transaction sequence events, the method and apparatus of the present invention has the effect of significantly reducing customer transaction time.

In order to modify the Transaction Sequence Table downline, for example, the host device 14 of FIG. 1 is controlled to format a modify message, which is then sent to the ACU or other ATM controller. This message includes various controls codes and the specific ordering of the events desired. In particular, the sequence is changed by reformatting the order of the event numbers (of TABLE I) which are used to describe the various transaction sequence events. Once the order of events in the Table is defined, the transaction sequence handler task starts with the first event in the Table and proceeds to call each event in sequence. This task is also responsible for checking error conditions. When all the events have had a chance to be called, i.e., the end of the Table has been reached, the transaction sequence handler task returns control to another task.

To facilitate the parallel processing of transaction sequence events according to the present invention, the software architecture includes a novel task processing scheme. In particular, the operating system of the ATM supports the concept of multi-tasking; i.e., the sharing of the same instruction set (i.e., the same code) by more than one task concurrently. As used herein, the term "task" refers to the various system processes which control the operation of the ATM. For example, the ACU includes two communications protocol handler tasks, one for handling the ACU/PCU interface and the other task for handling the ACU/host interface. As also discussed above, the ACU includes a transaction sequence handler task for controlling the sequence of transaction events. Of course, the ATM applications software located in the ACU includes other tasks including, for example, a maintenance panel handler task and a keyboard handler task.

As noted above, the various transaction sequence events are separated into command/request events and response/status events. Such events are enabled according to the method and apparatus of the present invention by being formatted into "messages." As used herein, the term "messages" refers to a stream of characters, including control characters and data characters. For example, when the ACU is ready to print header information on the receipt printer, the transaction sequence handler task formats a "print header" message including control characters identifying the receipt printer subsystem controller and data characters comprising the header message to be printed. Similar types of messages are created for each of the command/request and response/status events described above with respect to FIGS. 6 and 7. In accordance with the task handling feature of the present invention, such "messages" are passed between the ACU (or other ATM work station controller) and the various peripheral device subsystem controllers by the application tasks referred to above. In other words, the various ATM tasks communicate with each other via the messages. Using the example above for the sending of a "print header" message to the printer subsystem controller, the transaction sequence handler task in the ACU builds the appropriate message and calls its multi-tasking kernel, stored in the scheduler portion 82, which then causes this message to be transferred from the sequence handler task to the ACU/PCU communications protocol task. After the message is then passed to the PCU via line 54 in FIG. 2, it is received by the upper level communications protocol handler task in the PCU, (stored in switch 88) which passes it to the lower level communications protocol handler task located in peripheral interface portion 92. This lower level communications protocol handler task transmits the message to the receipt printer subsystem controller where it is queued onto a linked list for a specific task.

According to the present invention, two types of multi-tasking implementations are provided for task handling. In the first implementation, MTS or multitasking sequencer, non-prioritized scheduling of tasks is provided. As noted above, the MTS algorithm is placed in the ROM 86 in the PCU 52. Since MTS does not provide prioritized scheduling, each task has an equal opportunity to run. To accomplish this, all tasks are placed in a linked list and when one task suspends itself, the next task on the list will have an opportunity to run.

The former task will not have another opportunity to run until all other tasks have been given an opportunity. In the other implementation of the multi-tasking kernel, titled MTX or multi-tasking executive, prioritized task scheduling is provided. This implementation is utilized in the ACU.

According to the present invention, a task has two primary states: suspended and active. Active tasks may be further subdivided into the secondary states of scheduled, running, or preempted. Specifically, a task is in the active-running state when a processor is executing its code. A task is active-scheduled when it is waiting for its turn to run and active-preempted when it is interrupted and a higher priority task is activated. A task is deemed to be in a suspended state, when it is waiting for an external event, which according to the invention may be one of three types: the signaling of a semaphore, the reception of a message, or the expiration of a timer. Moreover, each of these events has an enabled flag and a triggered flag. If an event enabled flag is set, the event is conditioned to cause task resumption. However, if the flag is clear, no amount of triggering will change the task's status. The event-triggered flag, or ETF, is a hexadecimal byte variable having a range of 00H to OFFH. If ETF=OFFH, the event is clear and untriggered. However, when ETF=O, the event has been triggered exactly once. Generally, each time an event is triggered its ETF is incremented; the ETF being decremented only when the resumed task acknowledges the event.

Task management according to the MTS and MTX task scheduling routines utilizes a data structure called a task control block, or TCB. The TCB contains pointers, state flags, stack area, and a message exchange event control block (ECB), where messages are enqueued. Like all events, the exchange ECB has an event enabled flag and an event triggered flag. The exchange ECB will queue in first-in, first-out order all incoming and outgoing messages. The task will then process them in the same order that they were sent. As used herein, TCB is synonymous with task.

Generally, in the MTS dispatching algorithm all tasks have an equal opportunity to run and, as such, no task can be active-preempted. In operation, all tasks are placed in a linked list. When one task suspends itself, the next task in the list will have an opportunity to run, with the former task not having another opportunity to run until all other tasks have been given an opportunity. Most of the tasks therefore in the list will be in this suspended state. When a suspended task's enabled event is triggered, the task's state will be changed to active-scheduled. This task will only gain control of a processor after all the tasks ahead of it in the linked list have run.

To the contrary, MTX offers prioritized scheduling wherein if two tasks desired to run, the one with the higher priority gains control. In contradistinction to the MTS algorithm, there is no single linked list of all tasks, and instead several priority queues are utilized. In particular, one queue is defined for each priority level, and tasks are queued to the priority queue corresponding to their priority. As in the MTS algorithm, the queues are first-in, first-out. In operation, a low priority task will only gain control of a processor after all higher priority tasks (in the higher priority queues) and all equal priority tasks on its queue have suspended themselves. However, if a task's priority is greater than the priority of the task currently running, then the latter task is preempted and the higher priority task is resumed.

To preempt a task, the MTX algorithm will have the task's return address and register on the task's stack in the TCB. Subsequently, the MTX algorithm will place the task at the head of its priority queue, since a preempted task must regain control prior to all other tasks of the same priority.

Therefore, according to the present invention the various tasks associated with the ATM are managed through the use of a linked list (in the MTS implementation), and a plurality of priority queues (in the MTX implementation). Moreover, each task also includes a message exchange event control block (ECB) wherein the various messages which are sent between tasks are enqueued, also on a first-in, first-out basis. The various transaction sequence events described above; i.e., the command/request events and the response/status events, are implemented by transfer of such messages between the various tasks.

Normally, a task continues to be executed by a processor until it has no more processing to perform. At this point, the task is suspended and the multi-tasking operating system is informed that it can do nothing further until some external event occurs.

Figure 8:
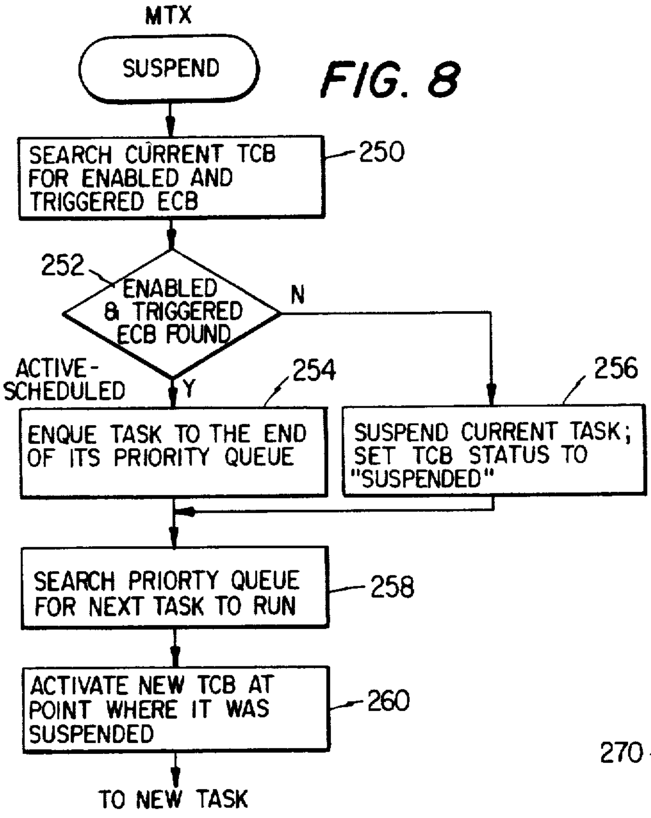
FIG. 8 is a flow chart for the SUSPEND routine of the operating system.

A "SUSPEND" routine, shown in a flow chart representation in FIG. 8, is utilized to determine whether a task should take control of a processor or remain suspended. Specifically, in step 250, the routine begins by searching a current TCB for an enabled and triggered ECB. During this step an interrupt window is also opened to allow the continued processing of interrupts. In step 252, a test is made to determine whether an enabled and triggered ECB for the task has been found. If so, the SUSPEND routine continues in step 254 to enqueue the task to the end of its priority queue. If the result of the test 252 is negative, the routine suspends the tasks and sets its "Status=Suspended" in step 256. In step 258, the routine continues by searching the priority queue for the next task to run. By step 260, the new TCB is activated at the point where it was suspended previously.

Figure 9:
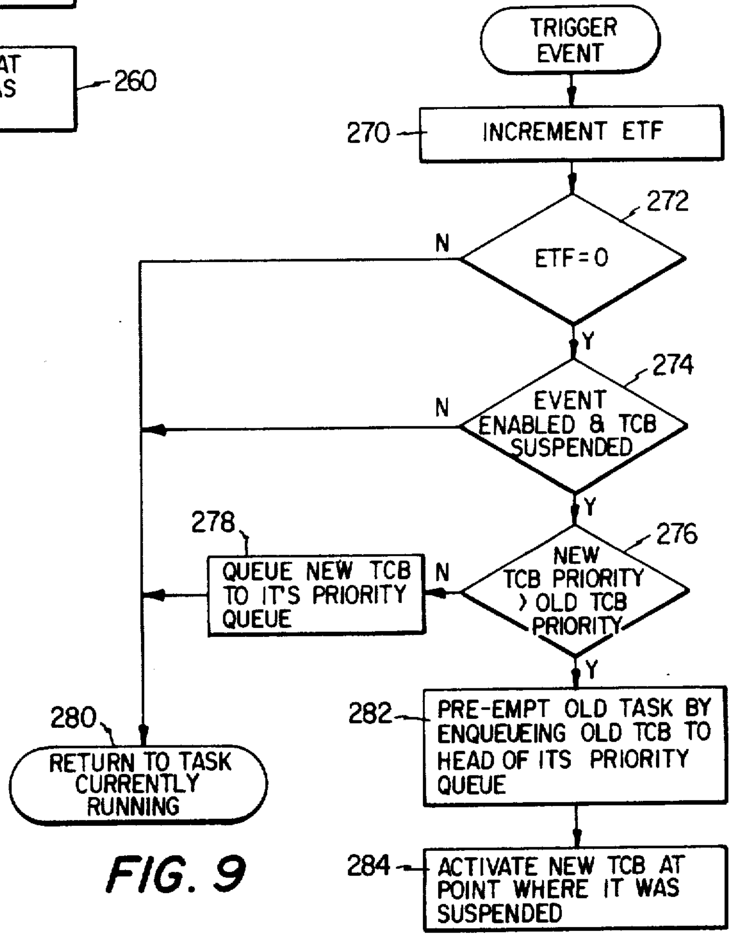
FIG. 9 is a flow chart diagram for the MTX routine when a trigger event occurs.

FIG. 9 is a flow chart diagramming the operation of the MTX algorithm when a trigger event occurs. As discussed above, such trigger events may be one of three types: the signaling of a semaphore, the reception of a message, or the expiration of a timer. Referring now to FIG. 9, when a trigger event occurs, the ETF is incremented in step 270. In step 272, a test is made to determine whether the ETF=0. As noted above, when ETF=0, the event has been triggered exactly once. If so, the routine continues to step 274 wherein a test is made to determine whether the event is enabled and the TCB is suspended. If so, the routine continues to step 276 where a test is made to determine whether the task's priority is higher than the priority of the task currently running. If not, the new TCB is enqueued to its priority queue in step 278. If the result of the tests 272 and 274 are negative, and also following the enqueueing of the new TCB to its priority queue, the routine returns in step 280. However, if the priority of the new TCB is higher than the priority of the currently running TCB, the currently running task is preempted by enqueueing the old TCB to the head of its priority queue in step 282. The routine continues to activate the new TCB at the point where it was suspended in step 284.

As an example of task management according to the method of the present invention, consider the two communications protocol handler tasks in the ACU. As noted above, one of these communications protocol handler tasks controls the ACU/PCU link whereas the other task handles the ACU/host link. Assuming that the ACU/PCU handler task is sending a message to the PCU, and before suspension of this task the ACU/host handler task receives the end of a message from the host (an enabling event), then if the tasks have equal priority, the host handler task will become active-scheduled and will be placed at the end of its priority queue. However, if the host handler task has a higher priority than the PCU handler task, it will preempt the PCU handler task by enqueueing this task to the head of its priority queue. The host handler task will then activate at the point where it was suspended previously.

Therefore, according to the present invention, the software architecture of the ACU forms a real-time operating system servicing communications to a host and multi-tasking input/output requests to, and responses from, the peripheral devices connected to the PCU or ACU. Parallel transaction sequence event processing is provided through the use of "intelligent" subsystem controllers used to control the various peripheral devices connected to the ATM. Specifically, a transaction sequence handler task controls the transaction sequence by stepping through a Transaction Sequence Table which vectors the task to the next transaction state. Error checking is also included to disallow any illegal sequences.

The multi-tasking operating system of the present invention includes a number of functional modules which provide various types of management. Table V below sets forth the most important type of modules which comprise the multi-tasking operating system.

TABLE V

| Generic ID | Module Title |
|---|---|
| MP | Processor Management |
| MI | Interrupt Management |
| MT | Time Management |
| MS | Semaphore Management |
| MC | Inter-task Communications Management |

As noted above, the TCB is the primary data structure used to define a task. A subroutine is provided in the Processor Management module for building a TCB in the RAM (of the ACU or PCU) based on input parameters. The Processor Management module also handles the suspension and activation of tasks, including the triggering of events in the selection of the next task to run as discussed above. Specifically, the processor Management module includes the MTS dispatching algorithm and the MTX dispatching algorithm which are described above generally. This module also includes the "SUSPEND" routine described with respect to FIG. 8, as well as other system routines for handling the enabling and triggering of events. For example, this module includes an Enable Resumption routine which sets the event enabled flag, a Disable Resumption routine which clears the event enabled flag, and a Test Event Triggered Flag routine which provides a quick way to check if an event has been triggered.

As discussed above, the Processor Management module of the multi-tasking operating system of the present invention also includes various routines for selecting the next task to run. In particular, a Call Task routine provides task A immediate access to task B, allowing task A to communicate asynchronously with respect to task B's normal processing sequence. Through this routine, task A may also pass parameters to task B and task B may return parameters to task A.

The multi-tasking operating system also includes a Interrupt Management module, the primary purpose of which is to define the interface between a user interrupt service routine (ISR) and the remainder of the system. This module includes a Discontinue ISR routine which terminates a user interrupt service routine and performs a return from interrupt. If the implementation is MTX, preemption of the interrupted task is also performed, if necessary as discussed above. This module also includes a Set ISR Entry Point routine which allows task level code to abort the normal ISR sequence.

The multi-tasking operating system also includes a Time Management module which handles the real-time clock hardware as well as delayed event triggering. Specifically, a Start Timer routine starts an interval timer and triggers the timer event on time-out. A Stop Timer routine serves to cancel an active timer and can be used, for example, when a task is timing the occurrence of an interrupt. A Restart Timer routine is a combination of the Stop Timer and Start Timer routines and is used when more than one consecutive interrupt needs to be timed. A Read Clock routine may also be utilized to return absolute clock readings.

The Semaphore Management module of the multi-tasking operating system provides the system routines which control the semaphore event. A semaphore is implemented with a data structure called a semaphore event control block also located within the TCB. This module includes various routines, such as a Signal Semaphore routine for synchronizing a task with some asynchronous external action such as an interrupt. An Acknowledge Semaphore routine reverses the action of the Signal Semaphore routine and decrements the ETS.

The Inter-Task Communications Management module of the multi-tasking operating system provides the system with inter-task communication capability; i.e., the creation, destruction, sending and receiving of messages. To create a message, the required amount of memory is first reserved and the first few bytes of this buffer is overlaid with a system header which facilitates the handling of messages. As discussed above, a task receives a message via the message exchange event control block, ECB, located within the TCB. Like all events, the exchange ECB has an event enabled flag and an event triggered flag. The Inter-Task Communications Management module includes a Create Message Routine which reserves memory and stores the system header overlay at the front of the memory buffer. A Destroy Message routine releases the memory, used for the message, back to the pool of memory blocks. A Send Message routine permits the transfer of messages from one task to another. Specifically, the message address supplied by the user is the address of the first byte of the user's message. This address must be the same as returned by the Create Message routine. The Receive Message routine dequeues the first message on the message exchange queue and returns the message address and length. It also acknowledges the ETF by decrementing it.

The program listings for the MTS and MTX implementations are set forth below:

```
                Z80 ASSEMBLER VER 3.0MR

;**********************************************
;
        TITLE   'VIKER PROCESSOR MANAGEMENT'
;
;**********************************************
;
MX      EQU     00
OP      EQU     -1
        LIST    S

        CSEG
        NLIST   I
        LIST    X
;CONDITIONAL ASSEMBLY FLAGS:
;
MPCAMX EQU      MX                  ;MTX OPTION FOR THE ACU.
MPCAMS EQU      .NOT.MPCAMX         ;MTS OPTION FOR THE PCU.
MPCAOP EQU      OP                  ;OPERATIONAL OPTION.
MPCADB EQU      .NOT.MPCAOP         ;DEBUG OPTION.
;
;SOFTWARE PART NUMBER:
;
        COND    MPCAMS.AND.MPCAOP
        NAME    MPMSOP
        ENDC
        COND    MPCAMS.AND.MPCADB
        ENDC
        COND    MPCAMX.AND.MPCAOP
        ENDC
        COND    MPCAMX.AND.MPCADB
        ENDC
;
;TARGET PRODUCT:
;       PCU OR ACU DEPENDING ON OPTION SELECTED
;
;TARGET PROCESSOR:
;       Z80
;
;AUTHOR:
;       S. WARD
;
;CREATION DATE:
;       15 JUN 81
;
;TECHNICAL MANAGER:
;       J. PRATHER
;
;SOFTWARE MANAGER:
;       J. HOUCK
;
;**********************************************
;
;       ABSTRACT
;
;**********************************************
;
;THIS IS THE PROCESSOR MANAGEMENT MODULE OF VIKER,
;DOCUTEL'S VIRTUAL OPERATING SYSTEM KERNEL.
;IT PROVIDES THE USER PRIMITIVES:
;       SUSPEND
;       ENABLE RESUMPTION
;       DISABLE RESUMPTION
;       TEST EVENT TRIGGERED FLAG
;IT PROVIDES INITIALIZATION SUBROUTINES:
;       PROCESSOR MANAGEMENT INITIALIZATION
;       CREATE TCB
;IT IMPLEMENTS THE FUNCTIONS:
;       SUSPEND THE OLD TASK, THEN SELECT AND ACTIVATE THE NEW TASK.
;       TRIGGER THE EVENT AND SCHEDULE THE NEW TASK.
```

```
;       IF MTX OPTION SELECTED, IT WILL ALSO PREEMPT THE OLD TASK
;       AND ACTIVATE THE NEW ONE.
;FINALLY, IT DEFINES THE TCB, TASK CONTROL BLOCK.

   VIKER PROCESSOR MANAGEMENT

;**********************************************
;
;       MODIFICATION HISTORY
;
;**********************************************
;
;RELEASE VERSION/
;CHANGE AUTHOR/                  CHANGE  CHANGE
;CHANGE DATE/            NUMBER/ DESCRIPTION/
;----------------        ------- -------------------
;01                      000     INITIAL VERSION

   VIKER PROCESSOR MANAGEMENT

;**********************************************
;
;       TABLE OF CONTENT
;
;**********************************************
;
;LABEL CONVENTIONS:
;
;MMSSXX
;MM             GENERIC MODULE ID
;  SS           SECTION OR SUBROUTINE ID
;    XX               MAKES UNIQUE SYMBOL
;               IF 00-99, IT IS AN EXECUTION LABEL
;               IF AA-ZZ, IT IS A DATA VARIABLE OR EQUATED SYMBOL
;
;TABLE OF CONTENT
;MP
;  CA           CONDITIONAL ASSEMBLY EQUATES
;  TC           TCB EQUATES
;  EC           ECB EQUATES
;  TD           TCB DESCRIPTOR EQUATES
;  SU           SUSPEND
       COND     MPCAMX  ;IF MTX-
       ENDC
;  ER           ENABLE RESUMPTION
;  DR           DISABLE RESUMPTION
;  TE           TEST EVENT TRIGGERED FLAG
;  CT           CREATE TCB
;  IN           PROCESSOR MANAGEMENT INITIALIZATION
;  BX           BEGIN EXECUTION
;  ET           TRIGGER AN EVENT
       COND     MPCAMX  ;IF MTX-
       ENDC
;  AT           ACTIVATE A NEW TASK
;  XT           COMMON PRIMITIVE EXIT
;  LE           LOCATE ECB
;  PE           PARSE EVENT CONTROL FLAG
       COND     MPCAMX  ;IF MTX-
       ENDC

   VIKER PROCESSOR MANAGEMENT

;**********************************************
;
;       GLOSSARY OF ACRONYMS
;
;**********************************************
;
;:CL            INTERRUPTS ENABLED ACCORDING TO CALLER
;:DI            INTERRUPTS DISABLED FOR THE PRECEDING T-STATES
;:EI            INTERRUPTS ENABLED FOR THE PRECEDING T-STATES
```

```
;ACU            ATM CONTROL UNIT
;ADDR           ADDRESS
;CF             CARRY FLAG
;CTC            COUNTER TIMER CIRCUIT
;DES            DESCRIPTOR
;DSA            DYNAMIC STORAGE ALLOCATION
;ECB            EVENT CONTROL BLOCK
;ECF            EVENT CONTROL FLAG
;ETF            EVENT TRIGGERED FLAG
;ETWS           EVENT TRIGGERED WHILE SCANNING FLAG
;HO             HIGH ORDER
;IB             INFORMATION BLOCK
;IFF            INTERRUPT FLIP-FLOP
;ISR            INTERRUPT SERVICE ROUTINE
;LO             LOW ORDER
;MSG            MESSAGE
;MTS            MULTI-TASKING SEQUENCER
;MTX            MULTI-TASKING EXECUTIVE
;PCU            PERIPHERAL CONTROL UNIT
;PF             PARITY FLAG
;PQ             PRIORITY QUEUE
;PQH            PRIORITY QUEUE HEADER
;PR             PRIMED REGISTER
;PRI            PRIMARY
;PTR            POINTER
;Q              QUEUE
;QH             QUEUE HEADER
;QHNC           QUEUE HEADER NUMBER
;SOS            STACK OVERFLOW SENTINEL
;SUS            STACK UNDERFLOW SENTINEL
;TCB            TASK CONTROL BLOCK
;TQ             TIMER QUEUE
;TQH            TIMER QUEUE HEADER
;VLI            VARIABLE LENGTH INDICATOR
;ZF             ZERO FLAG
;ZFR            INDICATES THAT A FIXED RELATIVE POSITION MUST BE
;               MAINTAINED TO THE SYMBOL FOLLOWING ZFR.  AN
;               INC INSTRUCTION HAS BEEN USED IN THE CODE TO
;               CHANGE THE POINTER.  ZFR (FIRST) INDICATES
;               AN ASSUMPTION IN THE CODE.  THE SYMBOLIC
;               OFFSET MUST BE FIRST IN ITS TABLE.
;ZNC            THE VALUE OF THIS SYMBOL CANNOT BE CHANGED.  DUE TO
;               NON-SYMBOLIC TESTING OR SETTING IN THE CODE.

   VIKER PROCESSOR MANAGEMENT

;*********************************************
;
;       CONFIGURATION AND INITIALIZATION REQUIREMENTS
;
;*********************************************
;
;1.  MPIN00 MUST BE CALLED FIRST BEFORE ANY OTHER VIKER MANAGEMENT
;    INITIALIZATION ROUTINES.
;2.  ALL ACTIONABLE TCB'S MUST BE CREATED.  THEN...
;3.  JUMP TO MPBX00, TO BEGIN OPERATIONS.

   VIKER PROCESSOR MANAGEMENT

;*********************************************
;
;       PUBLICS
;
;*********************************************
;
        PUBLIC  MPAT00          ;ACTIVATE A NEW TASK.
        PUBLIC  MPBX00          ;BEGIN EXECUTION.
        PUBLIC  MPCT00          ;CREATE TCB.
        PUBLIC  MPC100          ;CREATE ONE TCB.
        PUBLIC  MPDR00          ;DISABLE RESUMPTION.
```

```
PUBLIC  MPECTS              ;VALUE OF SEMAPHORE TYPE FOR USERS.
PUBLIC  MPECTT              ;VALUE OF TIMER TYPE FOR USERS.
PUBLIC  MPECTX              ;VALUE OF EXCHANGE TYPE FOR USERS.
PUBLIC  MPER00              ;ENABLE RESUMPTION.
PUBLIC  MPET00              ;TRIGGER AN EVENT.
PUBLIC  MPIN00              ;PROCESSOR MANAGEMENT INITIALIZATION.
PUBLIC  MPLE00              ;LOCATE ECB.
PUBLIC  MPPE00              ;PARSE EVENT CONTROL FLAG.
COND    MPCAMX              ;IF MTX-
ENDC
PUBLIC  MPSU00              ;SUSPEND.
PUBLIC  MPTE00              ;TEST EVENT TRIGGERED FLAG.
PUBLIC  MPXT00              ;COMMON PRIMITIVE EXIT.
COND    MPCADB              ;IF DEBUG-
ENDC

   VIKER PROCESSOR MANAGEMENT

;**************************************************
;
;       EXTERNALS
;
;**************************************************
        COND    MPCAMX          ;IF MTX-
        ENDC
        EXTRN   MCMIFF          ;HOLDS MEMORY BASED IFF.
        EXTRN   MOPQEA          ;ADDR OF LAST PQH.
        EXTRN   MOPQNO          ;NUMBER OF PQH'S.
        EXTRN   MOPQSA          ;START ADDR OF ALL PQH'S.
        EXTRN   MORTID          ;HOLDS RUNNING TASK'S TCB ID.
        COND    MPCAMX          ;IF MTX-
        ENDC
        EXTRN   MICV00          ;CREATE ISR VECTOR.
        EXTRN   MQDQ00          ;DEQUE FIRST ITEM FROM QUEUE.
        EXTRN   MQQH00          ;ENQUE ITEM TO HEAD OF QUEUE.
        EXTRN   MQQN00          ;ENQUE ITEM TO END OF QUEUE.
        COND    MPCADB          ;IF DEBUG-
        ENDC

   VIKER PROCESSOR MANAGEMENT

;**************************************************
;
;       TCB EQUATES
;
;**************************************************
;
;ECB PTR TABLE (VAR. LENGTH)
;
MPTCNS EQU      0               ;SUB-OFFSET TO # OF SEMAPHORES. ZFR FIRST.
MPTCNX EQU      1               ;SUB-OFFSET TO # OF MSG XCHG'S. ZFR MPTCNS.
       COND     MPCADB          ;IF DEBUG-
       ENDC
       COND     MPCAOP          ;IF OPERATIONAL-
MPTCNE EQU      2               ;SUB-OFFSET TO TOTAL # OF ECB'. (NOT PRESENT)
MPTCFP EQU      2               ;SUB-OFFSET TO 1ST ECB PTR
       ENDC
                                ;THERE IS ONE PTR FOR EACH ECB.
;
;ECB AREA
;
                                ;SEMAPHORE ECB'S LOCATED HERE.
                                ;MSG. XCHG. ECB'S LOCATED HERE.
                                ;TIMER ECB'S LOCATED HERE.
                                ;THERE MAY BE 0 TO 16 ECB'S FOR EACH TYPE.
;
;CONSTANT PART OF TCB
;
MPTCUA EQU      0               ;OFFSET TO USER AREA. (VAR. LENGTH).
MPTCCH EQU      MPTCUA-2        ;OFFSET TO TCB CHAIN FIELD.
MPTCST EQU      MPTCCH-1        ;OFFSET TO TASK STATUS BYTE.
```

```
MPTCSU EQU      0FFH               ;  VALUE FOR SUSPENDED.
MPTCAS EQU      0                  ;  VALUE FOR ACTIVE-SCHEDULED.
MPTCAR EQU      1                  ;  VALUE FOR ACTIVE-RUNNING.
MPTCBS EQU      7                  ;  BIT NUMBER OF SUSPENDED OR ACTIVE STATUS.
                                   ;  IF SET, TASK IS SUSPENDED.
                                   ;  IF CLEAR, TASK IS ACTIVE.
       COND     MPCAMX             ;IF MTX-
       ENDC
       COND     MPCAMS             ;IF MTS-
MPTCET EQU      MPTCST-1           ;OFFSET TO EVENT TYPE CAUSING RESUMPTION.
MPTCEN EQU      MPTCET-1           ;OFFSET TO EVENT # CAUSING RESUMPTION.
MPTCQH EQU      MPTCEN             ;SYMBOL FOR NEXT OFFSET EQUATE.
       ENDC
MPTCES EQU      MPTCQH-1           ;OFFSET TO EVENT TRIG. WHILE SCANNING FLAG.
MPTCNT EQU      0                  ;  VALUE FOR NO EVENT TRIGGERED. ZNC.
MPTCEV EQU      0FFH               ;  VALUE FOR EVENT TRIGGERED. ZNC.
MPTCSP EQU      MPTCES-2           ;OFFSET TO TCB'S STACK PTR.
MPTCEC EQU      MPTCSP-2           ;OFFSET TO ECB AREA PTR.
MPTCEP EQU      MPTCEC-2           ;OFFSET TO ECB PTR TABLE PTR.
MPTCCE DEFL     MPTCEP             ;SYMBOL FOR NEXT EQUATE.
       COND     MPCAMX             ;IF MTX-
       ENDC
       COND     MPCADB             ;IF DEBUG-

   VIKER PROCESSOR MANAGEMENT

       ENDC
       COND     MPCAOP             ;IF OPERATIONAL-
MPTCLS EQU      MPTCCE-2           ;OFFSET TO LAST WORD ON STACK.
       ENDC
;
;TCB LENGTHS
;
MPTCDS DEFL     0                  ;DEBUG STACK OVERHEAD.
       COND     MPCADB             ;IF DEBUG-
       ENDC
       COND     MPCAMX             ;IF MTX-
       ENDC
       COND     MPCAMS             ;IF MTS-
MPTCSS EQU      16+MPTCDS          ;SYSTEM STACK ALLOCATION.
                                   ;(+10 FOR USER ISR, SEC VEC PTR, IX, PC)
MPTCSP EQU      8                  ;AMOUNT ACTUALLY USED TO SAVE REGISTERS
                                   ;ON SUSPEND. (IY,IX,HL,PC)
MPTCSX EQU      6                  ;AMOUNT USED TO SAVE (IX,HL,PC).
       ENDC
MPTCNI EQU      -MPTCSS            ;NEGATED SYSTEM STACK SIZE FOR EXTRN'S.
MPTCCT EQU      MPTCSS-MPTCLS-2    ;LENGTH OF CONSTANT PART OF TCB.
                                   ;(INCLUDES SYSTEM STACK ALLOCATION.)

   VIKER PROCESSOR MANAGEMENT

;**************************************************
;
;      ECB EQUATES
;
;**************************************************
;
MPECVL EQU      0                  ;OFFSET TO VLI. ZFR FIRST.
MPECVS EQU      0                  ;  VALUE OF VLI FOR SEMAPHORE ECB.
MPECVX EQU      4                  ;  VALUE OF VLI FOR MSG. XCHG. ECB.
MPECVT EQU      6                  ;  VALUE OF VLI FOR TIMER ECB.
MPECEC EQU      1                  ;OFFSET TO EVENT CONTROL FLAG(ECF).
;
MPECMT EQU      0C0H               ;  MASK OVER EVENT TYPE.
MPECFS EQU      40H                ;  VALUE UNDER MASK FOR SEMAPHORE TYPE.
MPECFX EQU      80H                ;  VALUE UNDER MASK FOR MSG. XCHG. TYPE.
MPECFT EQU      0C0H               ;  VALUE UNDER MASK FOR TIMER TYPE.
MPECBT EQU      6                  ;  BIT NUMBER OF RIGHT MOST BIT OF TYPE MASK.
MPECTS EQU      MPECFS*4           ;  VALUE OF SEMAPHORE TYPE FOR USERS.
MPECTX EQU      MPECFX*4           ;  VALUE OF MSG. XCHG. TYPE FOR USERS.
MPECTT EQU      MPECFT*4           ;  VALUE OF TIMER TYPE FOR USERS.
;
```

```
MPECME EQU      20H             ;  MASK OVER EVENT ENABLED FLAG.
MPECEN EQU      20H             ;  VALUE UNDER MASK IF ENABLED. ZNC.
MPECDS EQU      00H             ;  VALUE UNDER MASK IF DISABLED. ZNC.
MPECEB EQU      5               ;  BIT NUMBER FOR ENABLED FLAG.
;
MPECMS EQU      10H             ;  MASK OVER INTERNAL EVENT FLAG.  USED BY TIMER
MPECBS EQU      4               ;  BIT NUMBER FOR INTERNAL FLAG.
;
MPECMN EQU      0FH             ;  MASK OVER EVENT # PER TYPE.
                                ;  VALUES ARE 0 TO 16 CONTIGUOUSLY.
;
MPECET EQU      2               ;OFFSET TO EVENT TRIGERED FLAG(ETF).
                                ;  VALUE 0FFH=NOT TRIGGERED.
                                ;  VALUE XX=EVENT TRIGGERED XX+1 TIMES.
MPECUN EQU      3               ;OFFSET TO UNIQUE PART OF ECB.
;
;UNIQUE PART OF MSG. XCHG. ECB DEFINITIONS.
;
MPECFI EQU      MPECUN+0        ;OFFSET TO FIRST-IN-Q PTR.
MPECLI EQU      MPECFI+2        ;OFFSET TO LAST-IN-Q PTR.
;
;UNIQUE PART OF TIMER ECB DEFINITIONS.
;
MPECTC EQU      MPECUN+0        ;OFFSET TO TCB ID.
MPECHT EQU      MPECTC+2        ;OFFSET TO HO TICK BYTE.
MPECLT EQU      MPECHT+1        ;OFFSET TO LO TICK BYTE.
MPECCH EQU      MPECLT+1        ;OFFSET TO TIMER Q CHAIN FIELD.

   VIKER PROCESSOR MANAGEMENT

;**************************************************
;
;       TCB DESCRIPTOR EQUATES
;
;**************************************************
;
MPTDNS EQU      0               ;OFFSET TO # OF SEMAPHORES.  ZFR FIRST.
MPTDNX EQU      MPTDNS+1        ;OFFSET TO # OF MSG. XCHG'S.  ZFR MPTDNS.
MPTDNT EQU      MPTDNX+1        ;OFFSET TO # OF TIMERS.  ZFR MPTDNX.
MPTDUS EQU      MPTDNT+1        ;OFFSET TO SIZE OF USER STACK.  ZFR MPTDNT.
MPTDEN EQU      MPTDUS+2        ;OFFSET TO TASK ENTRY POINT.
MPTDCT EQU      MPTDEN+2        ;OFFSET TO CALL TASK ENTRY POINT.
MPTDQH EQU      MPTDCT+2        ;OFFSET TO QHNO.
MPTDUA EQU      MPTDQH+1        ;OFFSET TO SIZE OF USER AREA.
MPTDNP EQU      MPTDUA+2        ;OFFSET TO # OF USER INIT. PARAMS.
MPTDNV EQU      MPTDNP+1        ;OFFSET TO # OF ISR VECTORS.
MPTDUP EQU      MPTDNV+1        ;OFFSET TO USER PARAMETERS.

   VIKER PROCESSOR MANAGEMENT

;**************************************************
;
;       MACRO DEFINITIONS
;
;**************************************************
;START /USR/NATM/ACU/INCL.LIB/MX.Z80
;VIKER TCB AND ISR DESCRIPTOR MACRO INCL FILE
;
;TCB DESCRIPTOR MACRO
;
;THIS MACRO IS USED TO ASSIST IN THE GENERATION OF A TCB DESCRIPTOR
;BLOCK.  IT CONTAINS ALL THE INFORMATION NEEDED TO GENERATE A TCB.
;
;PARAMS                  DESCRIPTION
;------          ----------------------------------------
;#ENT            TASK ENTRY POINT.  IT WILL GAIN CONTROL AT POWER UP
;                OR RESET.
;#CTE            CALLED TASK ENTRY POINT.  IT WILL GAIN CONTROL WHEN
;                A "CALL TASK" PRIMITIVE IS USED.  #CTE MUST BE 0
```

```
;                   FOR MTS AND FOR ANY MTX TASK WHICH HAS NO CALLED
;                   TASK ROUTINE.
;#UA                LENGTH OF THE TCB'S USER AREA. RANGE IS 0 TO OFFFFH.
;#US                SIZE OF STACK AREA REQUIRED BY USER.  THE SYSTEM
;                   STACK ALLOCATION WILL BE ADDED TO THIS VALUE.
;                   RANGE IS 0 TO OFFFFH.
;#NS                THE NUMBER OF SEMAPHORE ECB'S.  RANGE IS 0 TO 16.
;#NX                THE NUMBER OF MSG. XCHG. ECB'S. RANGE IS 0 TO 16.
;#NT                THE NUMBER OF TIMER ECB'S.      RANGE IS 0 TO 16.
;#QH                THE PRIORITY Q HEADER NUMBER FOR THIS TCB.  THE QHNO
;                   IS THE INVERSE OF THE TASK PRIORITY.  USE A VALUE
;                   OF 0 FOR ALL MTS TCB'S.
;                   RANGE IS 0,4,8,12,16,20...OFCH.  TO OPTIMIZE SYSTEM
;                   PERFORMANCE, KEEP THE HIGHEST QHNO AS LOW AS POSSIBLE.
;#NP                THE NUMBER OF USER PARAMETERS(BYTES) TO BE PLACED IN
;                   THE TCB'S USER AREA AT INITIALIZATION.  A USER TASK
;                   WILL FIND THEM AT OFFSET 0 RELATIVE TO THE TCB ID.
;                   THESE PARAMETER BYTES MUST BE PLACED IMMEDIATELY
;                   AFTER THE MACRO CALL.
;#NV                THE NUMBER OF ISR VECTORS REQUIRED FOR THIS TASK.
;                   THERE MUST BE #NV ISR VECTOR DESCRIPTOR MACRO CALLS
;                   IMMEDIATELY AFTER THE LAST USER PARAMETER BYTE.
;                   IF #NV IS 0, THE NEXT TCB DESCRIPTOR MACRO CALL
;                   MUST IMMEDIATELY FOLLOW THE USER PARAMETERS.
;
TCBD    MACRO       #ENT,#CTE,#UA,#US,#NS,#NX,#NT,#QH,#NP,#NV
        DEFB        .LOW.#NS
        DEFB        .LOW.#NX
        DEFB        .LOW.#NT
        DEFW        #US
        DEFW        #ENT
        DEFW        #CTE
        DEFB        .LOW.#QH
        DEFW        #UA
        DEFB        .LOW.#NP
```

VIKER PROCESSOR MANAGEMENT

```
     DEFB     .LOW.#NV
     ENDM
```

VIKER PROCESSOR MANAGEMENT

```
;
;ISR VECTOR DESCRIPTOR MACRO
;
;THIS MACRO IS USED TO ASSIST IN THE GENERATION OF AN ISR VECTOR
;DESCRIPTOR BLOCK.  THIS BLOCK CONTAINS ALL THE INFORMATION NEEDED
;TO BUILD A PRIMARY AND SECONDARY ISR VECTOR FOR THE TCB, WHOSE
;DESCRIPTOR BLOCK IMMEDIATELY PRECEDES THIS BLOCK(S).
;
;PARAMS                  DESCRIPTION
;------                  ----------------------------------------------
;#PVOFF                  THE OFFSET, RELATIVE TO THE PRIMARY VECTOR AREA START
;                  ADDRESS, TO STORE THE PRIMARY VECTOR.  BOTH #PVOFF AND
;                  THE START ADDRESS MUST BE EVEN NUMBERS.
;#ISRENT           THE ISR ENTRY ADDRESS.
;#TCBOFF           THE POSTIVE OFFSET, RELATIVE TO THE TCB ID, TO STORE
;                  LO BYTE OF THE ACTUAL PRIMARY VECTOR ADDRESS.  THIS
;                  LO BYTE MUST BE OUTPUT TO THE HARDWARE.  SUGGERST THAT
;                  THE VALUE USED FOR #NP(IN THE TCB DESCRIPTOR MACRO)
;                  EQUAL #TCBOFF.  IF SO, THE LO BYTE WILL BE STORED
;                  IMMEDIATELY AFTER THE USER PARAMETERS IN THE TCB'S USER
;                  AREA.  ALSO, IF #TCBOFF=OFFH, THEN THE LO BYTE WILL NOT
;                  STORED AT ALL.
;#PVCNT                  THE COUNT OF THE NUMBER OF PRIMARY VECTORS TO BE STORED.
;                  IF #PVCNT IS ONE, ONLY ONE PRIMARY VECTOR IS STORED.
;                  IF IT IS GREATER THAN ONE, THEN A TOTAL OF #PVCNT
;                  PRIMARY VECTORS WILL BE STORED IN CONTIGUOUS WORDS.
;                  THEY WILL ALL POINT TO THE SAME SECONDARY VECTOR,
```

```
;               AND THUS THEY WILL ALL HAVE THE SAME ISR ENTRY POINT.
;               SETTING #PVCNT TO 0 WILL GENERATE 256 PRIMARY VECTORS.
;
ISRD    MACRO   #PVOFF,#ISRENT,#TCBOFF,#PVCNT
        DEFB    .LOW.#PVOFF
        DEFW    #ISRENT
        DEFB    .LOW.#TCBOFF
        DEFB    .LOW.#PVCNT
        ENDM
;
;END /USR/NATM/ACU/INCL.LIB/MX.Z80


   VIKER PROCESSOR MANAGEMENT

;
;OFFSET REGISTER PAIR
;
;THIS MACRO IS USED TO INC OR DEC A REG. PAIR USING SYMBOLIC NOTATION.
;THUS A CHANGE TO SYMBOLS WILL CHANGE THE # OF INC'S OR DEC'S.  THIS
;MACRO IS NOT PRACTICAL IF #OFF IS GREATER THAN 4.
;
;PARAMS                  DESCRIPTIONS
;------                  ---------------------------------------------
;#R             REGISTER PAIR (BC,DE,HL,IX,IY)
;#OFF           POSITIVE OR NEGATIVE OFFSET FROM CURRENT VALUE.
;
OFF     MACRO   #R,#OFF
        COND    #OFF$.GT.0
        INC     #R
        OFF     #R,#OFF$-1
        ENDC
        COND    #OFF$.LT.0
        DEC     #R
        OFF     #R,#OFF$+1
        ENDC
        ENDM

   VIKER PROCESSOR MANAGEMENT

;
;DUPLICATE INSTRUCTION
;
;THIS MACRO WILL DUPLICATE THE SPECIFIED INSTRUCTION THE
;SPECIFIED NUMBER OF TIMES.
;
;PARAMS                  DESCRIPTION
;------                  ------------------------------------------
;#INST          LITERALLY THE INSTRUCTION TO DUPLICATE.
;#NO            THE NUMBER OF TIMES TO DUPLICATE IT.
;
DUP     MACRO   #INST,#NO
        COND    #NO$.GT.0
        #INST
        DUP     '#INST$',#NO$-1
        ENDC
        ENDM

        NLIST   M
```

VIKER PROCESSOR MANAGEMENT

```
;**************************************************
;
;       SUSPEND
;
;**************************************************
;
;THE PRIMARY PURPOSE OF "SUSPEND" IS TO INFORM VIKER THAT TASK A
;CAN DO NOTHING FURTHER UNTIL SOME EXTERNAL EVENT OCCURS.  TASK
;A IS THEN PUT TO SLEEP.  THAT IS, ITS REGISTERS AND STACK POINTER
;ARE SAVED.  ALSO ITS STATUS IS CHANGED TO SUSPENDED.  TASKS WITH
;EQUAL OR LOWER PRIORITY NOW HAVE AN OPPORTUNITY TO RUN.
;
;VIKER RESUMES (AWAKENS) A SUSPENDED TASK AT THE FIRST INSTRUCTION
;AFTER THE CALL TO SUSPEND.  IT APPEARS TO BE SIMPLY A RETURN
;FROM THE CALL.  THE EVENT TYPE AND EVENT NUMBER (WITHIN THE TYPE),
;WHICH CAUSED RESUMPTION, ARE RETURNED.
;
;IF NONE OF THE TASK'S ENABLED EVENTS ARE TRIGGERED PRIOR TO THE
;CALL TO "SUSPEND", THEN THE EVENT WHICH IS TRIGGERED FIRST
;CAUSES RESUMPTION.  CONVERSELY, IF THERE IS ONE OR MORE ENABLED
;AND TRIGGERED EVENTS PRIOR TO THE CALL TO "SUSPEND", THEN THE
;FIRST ONE FOUND WILL CAUSE RESUMPTION.  THE SEARCH OF EVENTS
;OCCURS IN THE ORDER OF SEMAPHORES, MESSAGE EXCHANGES AND
;TIMERS.  IT SEARCHES NUMERICALLY WITHIN EACH TYPE.
;
;IN THE LATTER SITUATION, WHERE THERE ARE ENABLED AND TRIGGERED
;EVENTS PRIOR TO "CALL SUSPEND", ALL TASKS OF EQUAL PRIORITY WILL
;HAVE AN OPPORTUNITY TO RUN.  IF THEIR STATUS IS ACTIVE-SCHEDULED,
;THEN THEY WILL RUN BEFORE TASK A REGAINS CONTROL.
;
;WHO MAY USE:
;       A USER TASK ONLY
;
;INVOCATION:
;       CALL     MPSU00
;
;USER STACK USAGE IN BYTES:
;       0
;
;SYSTEM STACK USAGE IN BYTES:
;       14, IF MTX
;        8, IF MTS
;
;T-STATES TAKEN:
;       233:DI  IF MTS AND WORST CASE
;       1240:DI IF MTX AND RESCHEDULING THE SAME TASK
;       910+34*N:DI      IF MTX AND SUSPENDING OLD TASK,
;                        WHERE N= # OF PIH'S SKIPPED.
;
;ENTRY REQUIREMENTS:
;       IFF=1=ENABLED
;
;RETURN CONDITIONS:
;       B=EVENT TYPE, WHICH CAUSED RESUMPTION
```

VIKER PROCESSOR MANAGEMENT

```
;       C=EVENT NUMBER, WHICH CAUSED RESUMPTION
;       IX=THIS USER'S TCB ID.
;       SAVED=HL,IY,IFF,PR'S
;       ALTERED=AF,DE
;
MPSU00:
        LD      IX,(MORTID)      ;FORCE USER'S IX TO BE HIS TCB ID.
        LD      B,H
        LD      C,L              ;SAVE HL IN BC.
        COND    MPCADB           ;IF DEBUG-
        ENDC
;
```

```
;SEARCH ECB'S FOR AN ENABLED AND TRIGGERED EVENT
;
MPSU10:                                 ;START LOOP TO SEARCH FOR TRIGGERED ECB.
        LD      (IX+MPTCES),MPTCNT      ;CLEAR ETWS FLAG.
        LD      H,(IX+MPTCEC+1)
        LD      L,(IX+MPTCEC)   ;HL=ECB AREA PTR.
        LD      DE,0
MPSU20:                                 ;START LOOP TO TEST EACH ECB.
        EI                      ;OPEN ISR WINDOW.
        ADD     HL,DE           ;HL=NEXT ECB PTR.
        DI
        LD      E,(HL)          ;E=VLI OR END OF ECB AREA FLAG.
        OFF     HL,MPECEC-MPECVL
        LD      A,(HL)          ;A=ECF.
        OFF     HL,MPECET-MPECEC        ;HL=ETF PTR.
        INC     E
        JR      Z,MPSU30        ;JUMP, IF WE ARE PAST LAST ECB.

        BIT     MPECBE,A
        JR      Z,MPSU20        ;JUMP, IF NOT ENABLED.

        LD      A,(HL)
        INC     A
        JR      Z,MPSU20        ;JUMP, IF NOT TRIGGERED.
                                ;END LOOP TO TEST EACH ECB.
        OFF     HL,MPECEC-MPECET        ;HL=ECF PTR.
        PUSH    BC              ;SAVE USER'S HL.
        LD      B,(HL)          ;B=ECF.
        CALL    MPPE00          ;PARSE ECF.  BC=EVENT TYPE & #.
        COND    MPCAMX          ;IF MTX-
        ENDC
        COND    MPCAMS          ;IF MTS-
        LD      (IX+MPTCET),B   ;STORE TYPE.
        LD      (IX+MPTCEN),C   ;STORE #.
        LD      (IX+MPTCST),MPTCAS      ;TCB STATUS=ACT.-SCH.
        ENDC
        POP     HL              ;RESTORE HL.
        JP      MPSU40          ;JUMP TO FINISH RESCHEDULING THE TASK.
MPSU30:
        BIT     0,(IX+MPTCES)   ;WAS ETWS FLAG SET DURING SCAN?
        JR      NZ,MPSU10       ;JUMP, IF ONE TRIGGERED.  GO FIND IT.
                                ;END LOOP TO SEARCH FOR TRIGGERED ECB.


  VIKER PROCESSOR MANAGEMENT

                                ;FALL, TO SUSPEND TCB.
;
;THIS ENTRY POINT SUSPENDS THE OLD TASK.
;
        LD      H,B
        LD      L,C             ;RESTORE USER'S HL.
        LD      (IX+MPTCST),MPTCSU      ;SET TCB STATUS TO SUSPENDED.
;
;THIS ENTRY POINT FINISHES RESCHEDULING THE OLD TASK.
;
MPSU40:
        COND    MPCAMX          ;IF MTX-
        ENDC                    ;END OF MTX CONDITIONAL.
        COND    MPCAMS          ;IF MTS-
        LD      B,H             ;SAVE HL.
        LD      C,L
        PUSH    IX
        POP     HL              ;HL=OLD TCB ID.
        OFF     HL,MPTCCH-MPTCUA        ;HL=TCB CHAIN FIELD PTR.
;
```

```
;SEARCH TCB LIST FOR ACTIVE-SCHEDULED TCB.
;
MPSU50:                                 ;START LOOP TO FIND ACTIVE TCB.
        EI                      ;OPEN ANOTHER ISR WINDOW.
        LD      E,(HL)
        DI
        INC     HL
        LD      D,(HL)          ;DE=NEXT TCB PTR.
        EX      DE,HL           ;HL=PTR TO NEXT TCB.
        LD      A,H             ;A=HO BYTE OF PTR TO NEXT TCB.
        OR      A
        JR      NZ,MPSU60       ;JUMP, IF WE HAVE NOT REACHED LAST TCB.
;
        LD      HL,(MOPQSA)     ;HL=PTR TO FIRST TCB IN LIST.
MPSU60:
        OFF     HL,MPTCST-MPTCCH        ;HL=STATUS BYTE PTR.
        BIT     MPTCBS,(HL)     ;TEST THE TCB SUSPENDED BIT.
        OFF     HL,MPTCCH-MPTCST        ;HL=CHAIN FIELD PTR.
        JR      NZ,MPSU50       ;JUMP, IF TCB SUSPENDED.
                                ;END LOOP TO FIND ACTIVE TCB.
;
;BEGIN RESUMPTION OF NEW TASK.  SWITCH TASKS.
;
        OFF     HL,MPTCUA-MPTCCH        ;HL=NEW TCB ID.
        EX      DE,HL           ;DE=NEW TCB ID.
        LD      HL,-6           ;OLD SP OFFSET WHEN REGS PUSHED.
        ADD     HL,SP
        LD      (IX+MPTCSP),L   ;STORE EVENTUAL SP VALUE
        LD      (IX+MPTCSP+1),H ;IN THE OLD TCB.
        PUSH    DE
        EX      (SP),IX         ;IX=NEW TCB ID.
        POP     DE              ;DE=OLD TCB ID.
        COND    MPCADB          ;IF DEBUG-
        ENDC

   VIKER PROCESSOR MANAGEMENT

        PUSH    BC              ;USER'S HL.
        PUSH    DE              ;USER'S IX.
        PUSH    IY              ;USER'S IY.
        JP      MPAT00          ;JUMP TO ACTIVATE NEW TASK.
        ENDC                    ;END MTS CONDITIONAL.

   VIKER PROCESSOR MANAGEMENT

        COND    MPCAMX          ;IF MTX-
        ENDC                    ;END MTX CONDITIONAL.

   VIKER PROCESSOR MANAGEMENT

;************************************************
;
;       ENABLE RESUMPTION
;
;************************************************
;
;THIS SYSTEM PRIMITIVE WILL SET AN EVENT ENABLED FLAG.  A
;TRIGGERED EVENT WILL NOT RESUME A SUSPENDED TASK, UNLESS
;IT IS ENABLED.
;
;WHO MAY USE:
;       A USER TASK ONLY
;
;INVOCATION:
;       CALL    MPER00
;
;USER STACK USAGE IN BYTES:
;       0
;
```

```
;SYSTEM STACK USAGE IN BYTES:
;       4
;
;T-STATES TAKEN:
;
;ENTRY REQUIREMENTS:
;       IFF=1=ENABLED
;       B=EVENT TYPE TO ENABLE
;       C=EVENT NUMBER TO ENABLE
;       IX=TCB ID TO WHICH THE EVENT BELONGS
;
;RETURN CONDITIONS:
;       SAVED=BC,DE,HL,IX,IY,IFF,PR'S
;       ALTERED=AF
;
MPERUD:
        DI
        PUSH    HL                  ;SAVE HL.
        COND    MPCADB              ;IF DEBUG-
        ENDC
        CALL    MPLEDO              ;LOCATE THE ECB.  HL=ECF PTR.
MPER15:                                     ;TRAP LABEL, IF ECB NOT FOUND.
        SET     MPECBE,(HL)         ;SET ENABLED BIT.
        POP     HL                  ;RESTORE HL.
        EI
        RET

   VIKER PROCESSOR MANAGEMENT

;**************************************************
;
;       DISABLE RESUMPTION
;
;**************************************************
;
;THIS SYSTEM PRIMITIVE WILL CLEAR THE EVENT ENABLED FLAG.  A
;TRIGGERED EVENT WILL NOT RESUME A SUSPENDED TASK, IF THE EVENT
;IS DISABLED.  THIS PRIMITIVE CAN BE USED WHEN AN EVENT COULD
;BE TRIGGERED AT AN INCONVENIENT TIME.
;
;WHO MAY USE:
;       A USER TASK ONLY
;
;INVOCATION:
;       CALL    MPDROO
;
;USER STACK USAGE IN BYTES:
;       0
;
;SYSTEM STACK USAGE IN BYTES:
;       4
;
;T-STATES TAKEN:
;
;ENTRY REQUIREMENTS:
;       IFF=1=ENABLED
;       B=EVENT TYPE TO DISABLE
;       C=EVENT NUMBER TO DISABLE
;       IX=TCB ID TO WHICH THE EVENT BELONGS
;
;RETURN CONDITIONS:
;       SAVED=BC,DE,HL,IX,IY,IFF,PR'S
;       ALTERED=AF
;
MPDROO:
        DI
        PUSH    HL                  ;SAVE HL.
        COND    MPCADB              ;IF DEBUG-
        ENDC
        CALL    MPLEOO              ;LOCATE ECB.  HL=ECF PTR.
```

```
MPDR15:                                         ;TRAP LABEL, IF ECB NOT FOUND.
        RES     MPECBE,(HL)     ;CLEAR ENABLED BIT.
        POP     HL              ;RESTORE HL.
        EI
        RET

   VIKER PROCESSOR MANAGEMENT

;***********************************************
;
;       TEST EVENT TRIGGERED FLAG
;
;***********************************************
;
;THIS SYSTEM PRIMITIVE PROVIDES A QUICK WAY TO CHECK IF AN
;EVENT HAS BEEN TRIGGERED.  IT RETURNS THE VALUE OF THE EVENT
;TRIGGERED FLAG AND THE STATE OF THE EVENT ENABLED FLAG.
;
;WHO MAY USE:
;       A USER TASK OR ISR
;
;INVOCATION:
;       CALL    MPTE00
;
;USER STACK USAGE IN BYTES:
;       0
;
;SYSTEM STACK USAGE IN BYTES:
;       6
;
;T-STATES TAKEN:
;
;ENTRY REQUIREMENTS:
;       B=EVENT TYPE TO TEST
;       C=EVENT NUMBER TO TEST
;       IX=TCB ID TO WHICH EVENT BELONGS
;
;RETURN CONDITIONS:
;       D=00, IF EVENT DISABLED
;       D=0FFH, IF EVENT ENABLED
;       E=EVENT TRIGGERED FLAG
;       SAVED=BC,HL,IX,IY,IFF,PR'S
;       ALTERED=AF
;
MPTE00:
        DI
        PUSH    HL              ;SAVE HL.
        CALL    MPLE00          ;LOCATE THE EVENT.  HL=ECF PTR.
MPTE05:                                         ;TRAP LABEL, IF ECB NOT FOUND.
        LD      A,(HL)          ;A=ECF.
        AND     MPECME          ;MASK OFF THE ENABLED BIT.
        DUP     'RLA',8-MPECBE  ;ROTATE IT TO THE CARRY BIT.
        SBC     A,0             ;A=0, IF EVENT DISABLED.
                                ;A=0FFH, IF EVENT ENABLED.
        LD      D,A             ;D=ENABLED FLAG.
        OFF     HL,MPECET-MPECEC        ;HL=ETF PTR.
        LD      E,(HL)          ;E=ETF.
        POP     HL              ;RESTORE HL.
        JP      MPXT00          ;COMMON EXIT TO TASK OR ISR LEVEL.
```

```
;*************************************************
;
;       CREATE TCB
;
;*************************************************
;
;THIS SUBROUTINE WILL BUILD ONE OR MORE TCB'S.  IT WILL ALSO
;BUILD ALL PRIMARY AND SECONDARY INTERRUPT VECTORS ASSOCIATED
;WITH THE TCB.  IT WILL RETURN THE TCB ID OF THE LAST TCB IT
;BUILT.  IF NECESSARY, THIS TCB ID CAN BE USED TO BUILD INTER-
;TASK REFERENCE TABLES.
;
;THE TCB'S ARE BUILT ACCORDING TO A DESCRIPTOR BLOCK.  THE
;MACRO CALL "TCBD" WILL GENERATE THE TCB DESCRIPTOR BLOCK.
;IF AN OFFH VALUE IS SEEN AS THE FIRST BYTE OF A TCB DESCRIPTOR,
;THE SUBROUTINE WILL STOP BUILDING TCB'S AND RETURN TO THE CALLER.
;NORMALLY, ONE WOULD EXPECT THE CALLER TO BE THE USER'S SYSTEM
;INITIALIZATION ROUTINE.
;
;IMMEDIATELY FOLLOWING EACH TCB DESCRIPTOR, IS A STRING OF
;PARAMETERS.  THE NUMBER OF PARAMETER BYTES MAY VARY FROM 0 TO
;255.  THESE PARAMETERS ARE COPIED FROM THEIR POSITION AFTER THE
;DESCRIPTOR TO THE FIRST BYTE OF THE TCB'S USER AREA.  TYPICALLY,
;THIS IS USED TO IDENTIFY A PORT ADDRESS ASSOCIATED WITH THE TCB.
;
;AFTER THE PARAMETER STRING, THERE MAY BE ZERO, ONE, OR MORE
;ISR VECTOR DESCRIPTORS.  THE MACRO CALL "ISRD" WILL
;GENERATE THE ISR VECTOR DESCRIPTORS.  THE PRIMARY AND SECONDARY
;INTERRUPT VECTORS ARE BUILT ACCORDING TO THESE DESCRIPTORS.
;THIS DESCRIPTOR OPTIONALLY STORES THE LOW ORDER BYTE OF THE
;PRIMARY VECTOR ADDRESS IN THE TCB'S USER AREA.  THE TASK CAN
;THEN ACCESS IT DURING ITS INITIALIZATION, AND OUTPUT IT TO
;THE HARDWARE DEVICE.
;
;ONCE THE TCB IS BUILT, IT WILL BE QUEUED TO ITS PRIORITY QUEUE.
;THERE IT WILL STAY, UNTIL "BEGIN EXECUTION" FINDS IT AND GIVES
;CONTROL TO ITS ENTRY POINT.
;
;WHO MAY USE:
;       A USER INITIALIZATION ROUTINE
;
;INVOCATION:
;       CALL    MPCT00
;
;USER STACK USAGE IN BYTES:
;       16
;
;SYSTEM STACK USAGE IN BYTES:
;       0
;
;T-STATES TAKEN:
;
;ENTRY REQUIREMENTS:
;       IFF=0=DISABLED
```

```
;       BC=PTR (EVEN NUMBER) TO START OF AREA FOR USER'S PRIMARY
;               VECTORS.  IT DOES NOT HAVE TO START ON AN EVEN 256 BYTE
;               PAGE BOUNDRY, BUT THERE MUST BE SUFFICIENT SPACE LEFT
;               IN THE PAGE FOR ALL PRIMARY VECTORS.
;       DE=PTR TO LIST OF TCB DESCRIPTORS.  THE LIST TERMINATES
;               WHEN THE FIRST BYTE OF A DESCRIPTOR=OFFH.
;       HL=PTR TO FREE AREA TO BUILD TCB'S.
;
```

```
;RETURN CONDITIONS:
;       HL=PTR TO FIRST FREE BYTE AFTER THE LAST BUILT TCB.
;       IX=TCB ID OF LAST BUILT TCB.
;       SAVED=BC,IFF,PR'S.
;       ALTERED=AF,DE,IY
;
;11111111111111111111111111111111111111111111111
;LOOP FOR EACH TCB DESCRIPTOR TO PROCESS
;11111111111111111111111111111111111111111111111
MPCT00:                                  ;START LOOP TO PROCESS EACH TCB DES.
       CALL     MPC100            ;BUILD ONE TCB.
;11111111111111111111111111111111111111111111111
;END LOOP, IF NO MORE TCB DESCRIPTORS TO PROCESS
;11111111111111111111111111111111111111111111111
;(SP)   =RETURN ADDR
;HL     =PTR TO NEXT FREE BYTE AFTER TCB AND VECTOR(S)
;DE     =PTR TO FIRST BYTE OF NEXT TCB DESCRIPTOR
;BC     =PTR TO PRIMARY VECTOR AREA START ADDR
;
       LD       A,(DE)            ;A=# OF SEMA'S OR END OF TCB DES LIST FLAG.
       INC      A                 ;IF A=0FFH, IT IS END OF TCB DES LIST FLAG.
       JP       NZ,MPCT00         ;JUMP, IF ANOTHER TCB DES TO PROCESS.
;
       RET                        ;RET, IF NO MORE DESCRIPTORS TO PROCESS.

   VIKER PROCESSOR MANAGEMENT

;*************************************************
;
;       CREATE ONE TCB
;
;*************************************************
;
;THIS SUBROUTINE WILL BUILD ONE TCB.  IT WILL ALSO
;BUILD ALL PRIMARY AND SECONDARY INTERRUPT VECTORS ASSOCIATED
;WITH THE TCB.  IT WILL RETURN THE TCB ID OF THE TCB IT
;BUILT.  IF NECESSARY, THIS TCB ID CAN BE USED TO BUILD INTER-
;TASK REFERENCE TABLES.
;
;THE TCB IS BUILT ACCORDING TO A DESCRIPTOR BLOCK.  THE
;MACRO CALL "TCBD" WILL GENERATE THE TCB DESCRIPTOR BLOCK.
;NORMALLY, ONE WOULD EXPECT THE CALLER TO BE THE USER'S SYSTEM
;INITIALIZATION ROUTINE.
;
;IMMEDIATELY FOLLOWING EACH TCB DESCRIPTOR, IS A STRING OF
;PARAMETERS.  THE NUMBER OF PARAMETER BYTES MAY VARY FROM 0 TO
;255.  THESE PARAMETERS ARE COPIED FROM THEIR POSITION AFTER THE
;DESCRIPTOR TO THE FIRST BYTE OF THE TCB'S USER AREA.  TYPICALLY,
;THIS IS USED TO IDENTIFY A PORT ADDRESS ASSOCIATED WITH THE TCB.
;
;AFTER THE PARAMETER STRING, THERE MAY BE ZERO, ONE, OR MORE
;ISR VECTOR DESCRIPTORS.  THE MACRO CALL "ISRD" WILL
;GENERATE THE ISR VECTOR DESCRIPTORS.  THE PRIMARY AND SECONDARY
;INTERRUPT VECTORS ARE BUILT ACCORDING TO THESE DESCRIPTORS.
;THIS DESCRIPTOR OPTIONALLY STORES THE LOW ORDER BYTE OF THE
;PRIMARY VECTOR ADDRESS IN THE TCB'S USER AREA.  THE TASK CAN
;THEN ACCESS IT DURING ITS INITIALIZATION, AND OUTPUT IT TO
;THE HARDWARE DEVICE.
;
;ONCE THE TCB IS BUILT, IT WILL BE QUEUED TO ITS PRIORITY QUEUE.
;THERE IT WILL STAY, UNTIL "BEGIN EXECUTION" FINDS IT AND GIVES
;CONTROL TO ITS ENTRY POINT.
;
;WHO MAY USE:
;       A USER INITIALIZATION ROUTINE
;
;INVOCATION:
;       CALL    MPC100
;
;USER STACK USAGE IN BYTES:
;       14
;
```

```
;SYSTEM STACK USAGE IN BYTES:
;       0
;
;T-STATES TAKEN:
;
;ENTRY REQUIREMENTS:
;       IFF=0=DISABLED
;       BC=PTR (EVEN NUMBER) TO START OF AREA FOR USER'S PRIMARY
;                 VECTORS.  IT DOES NOT HAVE TO START ON AN EVEN 256 BYTE
```

VIKER PROCESSOR MANAGEMENT

```
;                 PAGE BOUNDRY, BUT THERE MUST BE SUFFICIENT SPACE LEFT
;                 IN THE PAGE FOR ALL PRIMARY VECTORS.
;       DE=PTR TO TCB DESCRIPTOR.
;       HL=PTR TO FREE AREA TO BUILD TCB'S.
;
;RETURN CONDITIONS:
;       HL=PTR TO FIRST FREE BYTE AFTER THE TCB.
;       DE=PTR TO FIRST BYTE OF NEXT TCB DESCRIPTOR
;       IX=TCB ID OF LAST BUILT TCB.
;       SAVED=BC,IFF,PR'S.
;       ALTERED=AF,DE,IY
;
MPC100:
        PUSH    BC                ;SAVE PRI VECTOR AREA PTR FOR MUCH LATER.
        PUSH    HL                ;SAVE ECB PTR TABLE PTR FOR LATER. (1ST IN TCB
        PUSH    DE
        POP     IY                ;IY=PTR TO TCB DES.
        EX      DE,HL
;222222222222222222222222222222222222222222222222222
;CALCUALTE PTR TO ECB AREA.  STORE # OF SEMAPORES,
;# OF XCHG'S, AND (IF DEBUG) THE TOTAL # OF ECB'S.
;222222222222222222222222222222222222222222222222222
;(SP+4)          =RETURN ADDR
;(SP+2)          =PRI. VECTOR AREA PTR
;(SP)            =ECB PTR TABLE PTR
;HL     =DES PTR
;DE     =ECB PTR TABLE PTR
;
        LD      A,(HL)            ;A=# OF SEMA'S.
        OFF     HL,MPTDNX-MPTDNS
        ADD     A,(HL)            ;A=# OF SEMA'S PLUS # OF XCHG'S.
        OFF     HL,MPTDNT-MPTDNX
        ADD     A,(HL)
        LD      C,A               ;C=# OF ECB'S.
        OFF     HL,MPTDNS-MPTDNT          ;HL=PTR TO # OF SEMA'S IN DES.
        LD      A,(HL)            ;A=# OF SEMA'S.
        LD      (DE),A            ;STORE IN ECB PTR TABLE.
        OFF     HL,MPTDNX-MPTDNS
        OFF     DE,MPTCNX-MPTCNS
        LD      A,(HL)            ;A=# OF XCHG'S.
        LD      (DE),A            ;STORE IN ECB PTR TABLE.
        OFF     DE,MPTCNE-MPTCNX          ;DE=PTR TO TOTAL # OF ECB'S.
        LD      A,C               ;A=# OF ECB'S.
        COND    MPCADB            ;IF DEBUG-
        ENDC
        OFF     DE,MPTCEP-MPTCNE          ;DE=PTR TO FIRST PTR IN ECB PTR TAB.
        LD      H,D
        LD      L,E               ;HL=DE=PTR TO FIRST PTR IN ECB PTR TABLE.
        ADD     A,A               ;A=# OF BYTES OF PTRS IN ECB PTR TABLE.
        LD      C,A               ;2 BYTES PER PTR.
        LD      B,0               ;BC=OFFSET TO GET TO ECB AREA.
        ADD     HL,BC             ;HL=ECB AREA PTR.
        PUSH    HL                ;SAVE FOR LATER.
;222222222222222222222222222222222222222222222222222
```

VIKER PROCESSOR MANAGEMENT

```
; THE ECB PTR TABLE PTR'S.   THE VLI, ECF, AND ETF
;FOR ALL ECB'S.  STORE END OF ECB AREA FLAG.
;2222222222222222222222222222222222222222222222
;(SP+6)          =RETURN ADDR
;(SP+4)          =PRIMARY VECTOR AREA PTR
;(SP+2)          =ECB PTR TABLE PTR
;(SP)   =ECB AREA PTR
;IY     =PTR TO # OF SEMA'S IN DES
;HL     =ECB AREA PTR
;DE     =PTR TO FIRST ECB PTR
;
        PUSH    HL
        LD      HL,MPC1VT
        EX      (SP),HL         ;(SP)=VLI/TYPE TABLE ADDR.
        EX      DE,HL           ;DE=ECB AREA PTR. HL=1ST ECB PTR PTR.
MPC110:
        LD      A,(IY)          ;A=# OF ECB'S THIS TYPE FROM DES.
        INC     IY              ;NEXT TYPE.
        LD      B,A             ;MAINTAIN IN B.
        OR      A
        JR      Z,MPC140        ;JUMP, IF NO ECB'S THIS TYPE.
;
        LD      C,0             ;C=CURRENT ECB # THIS TYPE.
MPC120:                                 ;START LOOP FOR EACH ECB THIS TYPE.
        LD      (HL),E          ;STORE PTR TO ECB IN ECB PTR TABLE.
        INC     HL
        LD      (HL),D
        INC     HL              ;HL=PTR TO NEXT ECB PTR.
        EX      (SP),HL         ;HL=PTR TO VLI/TYPE TABLE.
        LD      A,(HL)          ;VLI THIS TYPE.
        LD      (DE),A          ;STORE VLI IN ECB.
;
        OFF     DE,MPECEC-MPECVL        ;DE=PTR TO ECF.
        INC     HL
        LD      A,(HL)          ;A=TYPE CODE THIS TYPE.
        DEC     HL              ;HL=PTR TO VLI IN TABLE FOR THIS TYPE.
        OR      C               ;OR TYPE AND # TOGETHER FOR ECF.
        INC     C               ;C=NEXT ECB # THIS TYPE.
        LD      (DE),A          ;STORE ECF IN ECB.
;
        OFF     DE,MPECET-MPECEC        ;DE=PTR TO ETF IN ECB.
        LD      A,0FFH
        LD      (DE),A          ;STORE ETF=0FFH.
;
        LD      A,(HL)          ;A=VLI FOR THIS TYPE.
        EX      (SP),HL         ;HL=ECB PTR PTR.
        INC     A
MPC130:                                 ;START LOOP TO SKIP UNIQUE PART OF THIS ECB
        INC     DE
        DEC     A
        JR      NZ,MPC130       ;END LOOP TO SKIP UNIQUE PART OF ECB.
;
        DJNZ    MPC120          ;JUMP, IF MORE ECB'S THIS TYPE.
                                ;END LOOP FOR EACH ECB THIS TYPE.
```

VIKER PROCESSOR MANAGEMENT

```
MPC140:
        EX      (SP),HL         ;HL=PTR TO VLI/TYPE TABLE.
        INC     HL
        INC     HL              ;HL=PTR TO VLI OF NEXT TYPE.
        LD      A,(HL)          ;A=VLI NEXT TYPE.
        EX      (SP),HL         ;HL=ECB PTR PTR.
        INC     A               ;VLI=0FFH WHEN ALL TYPES DEFINED.
        JR      NZ,MPC110       ;JUMP, IF ALL TYPES HAVE BEEN PROCESSED.
                                ;END LOOP FOR EACH ECB TYPE.
;
```

```
        EX      DE,HL               ;HL=END OF ECB AREA PTR.
        LD      (HL),0FFH           ;STORE END OF ECB AREA FLAG(SOS).
;
        POP     DE                  ;CLEAR STACK OF VLI/TYPE TABLE PTR.
        PUSH    HL                  ;SAVE SOS PTR FOR LATER.
;2222222222222222222222222222222222222222222222
;CALCULATE THE TCB ID.  STORE SP IN TCB.
;(IF DEBUG) STORE SOS PTR AND SUS IN TCS.
;STORE ECB AREA PTR IN TCB.
;STORE ECB PTR TABLE PTR IN TCB.
;2222222222222222222222222222222222222222222222
;(SP+8)         =RETURN ADDR
;(SP+6)         =PRIMARY VECTOR AREA PTR
;(SP+4)         =ECB PTR TABLE PTR
;(SP+2)         =ECB AREA PTR
;(SP)   =SOS PTR
;IY     =PTR TO USER STACK SIZE IN DES
;HL     =SOS PTR
;
        LD      C,(IY)
        LD      B,(IY+1)            ;BC=USER STACK SIZE.
        INC     HL                  ;HL=PTR TO BOTTOM OF STACK AREA.
        ADD     HL,BC               ;HL=PTR TO BOTTOM OF SYSTEM STACK ALLOCATION.
        PUSH    HL                  ;SAVE FOR LATER.
        LD      BC,MPTCSS-MPTCSR            ;BC=AMOUNT OF SYSTEM STACK NOT
                                    ;USED DURING SUSPEND.
        ADD     HL,BC               ;HL=PTR TO BOTTOM OF STACK USED DURING SUSPEND
        EX      (SP),HL             ;SAVE FOR LATER.
                                    ;HL=PTR TO BOTTOM OF SYSTEM STACK ALLOCATION.
        LD      BC,MPTCCT           ;LENGTH OF CONSTANT PART OF TCB.
                                    ;(INCLUDES SYSTEM STACK ALLOCATION)
        ADD     HL,BC
        PUSH    HL
        POP     IX                  ;IX=TCB ID
;
        COND    MPCADB              ;IF DEBUG-
        ENDC
        POP     HL                  ;HL=PTR TO BOTTOM OF STACK DURING SUSPEND.
        LD      (IX+MPTCSP),L       ;STORE THE SP IN THE TCB. THUS A NORMAL
        LD      (IX+MPTCSP+1),H     ;ACTIVATE AFTER SUSPEND WILL BRING
                                    ;THE STACK USAGE TO ZERO.
        POP     HL                  ;HL=SOS PTR.
        COND    MPCADB              ;IF DEBUG-
        ENDC
```

VIKER PROCESSOR MANAGEMENT

```
;
        POP     HL                  ;HL=ECB AREA PTR.
        POP     DE                  ;DE=ECB PTR TABLE PTR.
        LD      (IX+MPTCEC),L       ;STORE ECB AREA PTR.
        LD      (IX+MPTCEC+1),H
        LD      (IX+MPTCEP),E       ;STORE ECB PTR TABLE PTR IN TCB.
        LD      (IX+MPTCEP+1),D
;2222222222222222222222222222222222222222222222
; THE UNIQUE PARTS OF THE ECB'S.  ONLY MSG.
;XCHG AND TIMER ECB'S HAVE UNIQUE PARTS.
;2222222222222222222222222222222222222222222222
;(SP+2)         =RETURN ADDR
;(SP)   =PRIMARY VECTOR AREA PTR
;IY     =PTR TO USER STACK SIZE IN DES
;IX     =TCB ID
;HL     =ECB AREA PTR
;
```

```
        LD      DE,0                ;OFFSET TO NEXT ECB.
MPC150:                                     ;START LOOP TO  UNIQUE PARTS OF ECB'S.
        ADD     HL,DE               ;HL=PTR TO NEXT ECB.
        LD      E,(HL)              ;DE=OFFSET TO NEXT ECB.
        OFF     HL,MPECEC-MPECVL            ;HL=PTR TO ECF.
        LD      A,(HL)              ;A=ECF.
        OFF     HL,MPECET-MPECEC            ;HL=PTR TO ETF.
        INC     E                   ;TEST IF VLI=OFFH. (END OF ECB AREA FLAG)
        JP      Z,MPC170            ;JUMP, IF ALL ECB'S HAVE BEEN DEFINED.
;
        AND     MPECMT              ;MASK OFF EVENT TYPE IN ECF.
        CP      MPECFS
        JR      Z,MPC150            ;JUMP, IF SEMAPHORE TYPE.
;
        CP      MPECFX
        JR      Z,MPC160            ;JUMP, IF XCHG TYPE.
                                    ;FALL, IF TIMER TYPE.
;
        PUSH    HL                  ;SAVE ETF PTR.
        OFF     HL,MPECTC-MPECET            ;HL=PTR TO TCB ID.
        PUSH    IX
        POP     BC
        LD      (HL),C              ;STORE TCB ID IN TIMER ECB.
        INC     HL
        LD      (HL),B
;
        OFF     HL,MPECCH-MPECTC            ;HL=PTR TO HO BYTE OF CHAIN FIELD.
        LD      (HL),OFFH           ;MARK CHAIN FIELD AS DEQUED.
        POP     HL                  ;HL=ETF PTR.
        JR      MPC150              ;PROCESS NEXT ECB.
;
MPC160:                                     ;PROCESS XCHG TYPE.
        PUSH    HL                  ;SAVE ETF PTR.
        XOR     A
        OFF     HL,MPECFI-MPECET            ;HL=FIRST IN Q PTR PTR.
        LD      B,H
        LD      C,L                 ;BC=FIRST IN Q PTR PTR.
```

VIKER PROCESSOR MANAGEMENT

```
        LD      (HL),A              ;SET FIRST IN Q PTR TO 0000H.
        INC     HL
        LD      (HL),A
        OFF     HL,MPECLI-(MPECFI+1)    ;HL=LAST IN Q PTR PTR.
        LD      (HL),C              ;STORE FIRST IN Q PTR PTR IN LAST IN Q PTR.
        INC     HL
        LD      (HL),B
        POP     HL                  ;HL=ETF PTR.
        JR      MPC150              ;PROCESS NEXT ECB.
                                    ;END LOOP TO  UNIQUE PARTS OF ECB'S.
MPC170:                                     ;ALL ECB'S DEFINED.
;2222222222222222222222222222222222222222222222
;STORE TASK ENTRY POINT IN TCB.
;STORE TCB ID AS IX IN STACK.  (IF MTX) STORE CALLED
;TASK ENTRY POINT AND QHNO IN TCB.  INITIALIZE TCB
;STATUS AND CHAIN FIELD.  ENQUE TCB TO ITS PRIORITY Q.
;2222222222222222222222222222222222222222222222
;(SP+2)        =RETURN ADDR
;(SP)  =PRIMARY VECTOR AREA PTR
;IY    =PTR TO USER STACK SIZE IN DES.
;IX    =TCB ID
;
        PUSH    IY
        POP     HL                  ;HL=DES PTR.
        OFF     HL,MPTDEN-MPTDUS            ;HL=TASK ENTRY POINT PTR IN DES.
        LD      C,(HL)
        INC     HL
        LD      B,(HL)              ;BC=TASK ENTRY POINT.
        LD      (IX+MPTCLS),C       ;STORE TASK ENTRY POINT AS LAST ITEM
        LD      (IX+MPTCLS+1),B     ;ON TCB STACK, SO ACTIVATE ROUTINE
                                    ;WILL USE IT AS RETURN ADDR.
```

```
        PUSH    IX
        POP     BC                  ;BC=TCB ID.
        LD      (IX+MPTCLS-MPTCSX+2),C  ;STORE TCB TO WHERE IX IS ON
        LD      (IX+MPTCLS-MPTCSX+3),B  ;STACK, SO ACT. RT. WILL POP IT.
;
        OFF     HL,MPTDCT-(MPTDEN+1)    ;HL=CALLED TASK ENTRY POINT PTR.
        LD      C,(HL)
        INC     HL
        LD      B,(HL)              ;BC=CALLED TASK ENTRY POINT.
        COND    MPCAMX              ;IF MTX-
        ENDC
;
        OFF     HL,MPTDQH-(MPTDCT+1)    ;HL=QHNO PTR IN DES.
        LD      A,(HL)              ;A=QHNO.
        PUSH    HL                  ;SAVE DES PTR.
        PUSH    IX
        POP     HL                  ;HL=TCB ID.
        COND    MPCAMX              ;IF MTX-
        ENDC
        COND    MPCAMS              ;IF MTS-
        LD      DE,MPTCST           ;DE=OFFSET TO STATUS IN TCB.
        ADD     HL,DE               ;HL=STATUS BYTE PTR IN TCB.
        XOR     A                   ;FORCE QHNO TO 0 FOR ENQUE LATER.
```

VIKER PROCESSOR MANAGEMENT

```
        ENDC
        LD      (HL),MPTCAS         ;STORE ACTIVE-SCHEDULED STATUS IN TCB.
;
        OFF     HL,MPTCCH+1-MPTCST      ;HL=PTR TO HO BYTE OF CHAIN FIELD.
        LD      (HL),0FFH           ;MARK CHAIN FIELD AS DEQUED.
;
        DEC     HL                  ;HL=CHAIN FIELD PTR IN TCB.
        LD      E,A                 ;E=QHNO FROM BEFORE.
        LD      D,.HIGH.MOPQSA      ;DE=PQH PTR FOR THIS TCB.
        CALL    MQINQQ              ;ENQUE TCB TO ITS PQH.
;
        POP     HL                  ;HL=QHNO PTR IN DES.
;2222222222222222222222222222222222222222222222222
;COPY USER'S PARAMETERS FROM DES TO TCB USER'S AREA.
;2222222222222222222222222222222222222222222222222
;(SP+2)          =RETURN ADDR
;(SP)   =PRIMARY VECTOR AREA PTR
;IX     =TCB ID
;HL     =QHNO PTR IN DES
;
        OFF     HL,MPTDUA-MPTDQH        ;HL=USER AREA SIZE PTR IN DES.
        LD      C,(HL)
        INC     HL
        LD      B,(HL)              ;BC=UA SIZE.
        OFF     HL,MPTDNP-(MPTDUA+1)    ;HL=# OF PARAMS PTR IN DES.
        LD      A,(HL)              ;A=# OF USER PARAMS.
        OFF     HL,MPTDNV-MPTDNP        ;HL=# OF VECTORS PTR IN DES.
        PUSH    HL                  ;SAVE FOR LATER.
        OFF     HL,MPTDUP-MPTDNV        ;HL=PTR TO PARAMS AFTER DES.
        PUSH    HL                  ;SAVE FOR NOW.
;
        PUSH    IX
        POP     HL
        LD      D,H
        LD      E,L                 ;DE=HL=TCB ID=USER AREA PTR.
        ADD     HL,BC               ;HL=PTR TO NEXT FREE BYTE AFTER UA.
        EX      (SP),HL             ;HL=PTR TO USER PARAMS AFTER DES.
        LD      C,A
        LD      B,0                 ;BC=# OF USER PARAMS.
        OR      A
        JR      Z,MPC180            ;JUMP, IF NO USER PARAMS TO MOVE.
;
        LDIR                        ;COPY USER PARAMS TO USER AREA.
;
```

```
MPC180:
        PUSH    HL              ;HL=PTR TO ISR DESCRIPTORS AFTER USER PARAMS.
;22222222222222222222222222222222222222222222222222
;BUILD PRIMARY AND SECONDARY INTERRUPT VECTORS
;22222222222222222222222222222222222222222222222222
;(SP+8)          =RETURN ADDR
;(SP+6)          =PRIMARY VECTOR AREA START PTR
;(SP+4)          =PTR TO # OF ISR VECTORS TO BUILD
;(SP+2)          =PTR TO NEXT FREE BYTE AFTER UA IN TCB
;(SP)    =PTR TO ISR DESCRIPTOR(S)

   VIKER PROCESSOR MANAGEMENT

;IX      =TCB ID
;
        CALL    MICV00          ;BUILD THE ISR VECTORS.
        RET
;
;VLI/TYPE TABLE FOR EACH ECB TYPE
;
MPI1VT:
        DEFB    MPECVS,MPECFS   ;SEMAPHORE TYPE.
        DEFB    MPECVX,MPECFX   ;MSG. XCHG. TYPE.
        DEFB    MPECVT,MPECFT   ;TIMER TYPE.
        DEFB    0FFH            ;END OF TABLE.

   VIKER PROCESSOR MANAGEMENT

;**************************************************
;
;       PROCESSOR MANAGEMENT INITIALIZATION
;
;**************************************************
;
;THIS SUBROUTINE WILL INITIALIZE THE PRIORITY QUEUE(S)
;IF IT'S MTX, IT WILL ALSO BUILD THE IDLE LOOP TCB.
;IF IT'S MTS, ONLY THE IDLE LOOP STACK NEEDS INITIALIZING.
;IF IT'S DEBUG, THE DEBUG MODULE WILL BE INITIALIZED.
;
;WHO MAY USE:
;       A USER INITIALIZATION ROUTINE
;
;INVOCATION:
;       CALL    MPIN00
;
;USER STACK USAGE IN BYTES:
;       14
;
;SYSTEM STACK USAGE IN BYTES:
;       0
;
;T-STATES TAKEN:
;
;ENTRY REQUIREMENTS:
;       IFF=0=DISABLED
;       HL=PTR TO START OF AREA TO BUILD TCB'S
;
;RETURN CONDITIONS:
;       HL=PTR TO FIRST FREE BYTE AFTER BUILDING ANY TCB'S.
;       SAVED=IFF,PR'S.
;       ALTERED=AF,BC,DE,IX,IY
;
MPIN00:
        PUSH    HL
        COND    MPCADB          ;IF DEBUG-
        ENDC
;
```

```
;INITIALIZE PQH'S
;
        XOR     A
        LD      HL,MDPQSA       ;HL=PTR TO START OF PQH'S.
        LD      B,.LOW.MDPQNO   ;B=NO. OF PQH'S.
MPIN10:                                 ;START LOOP TO INIT. EACH PQH.
        LD      D,H
        LD      E,L
        LD      (HL),A          ;SET FIRST IN Q PTR=0000H.
        INC     HL
        LD      (HL),A
        INC     HL
        LD      (HL),E          ;SET LAST IN Q PTR=FIRST IN Q PTR.
        INC     HL
        LD      (HL),D

   VIKER PROCESSOR MANAGEMENT

        INC     HL
        DJNZ    MPIN10          ;END LOOP TO INIT. EACH PQH.
;
        POP     HL
        COND    MPCAMX          ;IF MTX-
        ENDC
        RET


   VIKER PROCESSOR MANAGEMENT

;***********************************************
;
;       BEGIN EXECUTION
;
;***********************************************
;
;THIS ROUTINE STARTS THE VIKER MULTI-TASKING SYSTEM.  ALL
;VIKER MANAGEMENT INITIALIZATION ROUTINES MUST BE CALLED AND
;ALL ACTIONABLE USER TCB'S MUST BE CREATED PRIOR TO THE JUMP
;TO THIS ROUTINE.
;
;WHO MAY USE:
;       A USER INITIALIZATION ROUTINE
;
;INVOCATION:
;       JP       MPBX00
;
;USER STACK USAGE IN BYTES:
;       0
;
;SYSTEM STACK USAGE IN BYTES:
;       0, IF MTS
;       2, IF MTX
;
;T-STATES TAKEN:
;
;ENTRY REQUIREMENTS:
;       IFF=0=DISABLED
;       VIKER INITIALIZATION MUST BE COMPLETE
;
;RETURN CONDITIONS:
;       NO RETURN
;
MPBX00:
        COND    MPCAMX          ;IF MTX-
        ENDC
        COND    MPCAMS          ;IF MTS-
        LD      IX,(MDPQSA)     ;IX=CHAIN FIELD PTR OF FIRST TCB.
        OFF     IX,MPTCUA-MPTCCH        ;IX=TCB ID.
        ENDC
        JP      MPAT00          ;ACTIVATE THE FIRST TCB.
```

```
VIKER PROCESSOR MANAGEMENT

        COND    MPCAMX          ;IF MTX-
        ENDC                    ;END MTX CONDITIONAL.

VIKER PROCESSOR MANAGEMENT

        COND    MPCAMS          ;IF MTS-
;*************************************************
;
;       TRIGGER AN EVENT
;
;*************************************************
;
;INC ETF.  IF ETF=0, AND IF EVENT ENABLED, AND IF TCB
;SUSPENDED, THEN STORE EVENT TYPE AND # IN TCB, AND
;SET TCB STATUS TO ACTIVE-SCHEDULED.
;
;WHO MAY USE:
;       MTS ONLY
;
;INVOCATION:
;       CALL    MPETOO
;
;USER STACK USAGE IN BYTES:
;       0
;
;SYSTEM STACK USAGE IN BYTES:
;       0
;
;T-STATES TAKEN:
;       34:DI, IF ETF NOT 0
;       51:DI, IF NOT ENABLED
;       75:DI, IF NOT SUSPENDED
;       141:DI, ELSE.
;
;ENTRY REQUIREMENTS:
;       IFF=0=DISABLED
;       B=EVENT TYPE
;       C=EVENT #
;       HL=ECF PTR
;       IX=TCB ID TO TRIGGER
;
;RETURN CONDITIONS:
;       SAVED=BC,DE,IX,IY,IFF,PR'S
;       ALTERED=AF,HL
;
MPETOO:
        OFF     HL,MPECET-MPECEC
        INC     (HL)            ;INC THE ETF.
        OFF     HL,MPECEC-MPECET        ;HL=ECF PTR.
        RET     NZ              ;RET, IF ETF NOT ZERO.
;
        BIT     MPECBE,(HL)     ;TEST EVENT ENABLED BIT.
        RET     Z               ;RET, IF EVENT NOT ENABLED.
;
        LD      (IX+MPTCES),MPTCEV      ;SET ETWS FLAG.
        BIT     MPTCBS,(IX+MPTCST)      ;TEST TCB STATUS BIT.
        RET     Z               ;RET, IF TCB NOT SUSPENDED.
;
        LD      (IX+MPTCST),MPTCAS      ;SET STATUS TO ACT.-SCHEDULED.
        LD      (IX+MPTCET),B   ;STORE EVENT TYPE.
        LD      (IX+MPTCEN),C   ;STORE EVENT #.
        RET
```

VIKER PROCESSOR MANAGEMENT

```
;*************************************************
;
;       ACTIVATE A NEW TASK
;
;*************************************************
;
;FETCH SP FROM NEW TCB, STORE TCB ID, SET BC TO RESUMPTION CODE,
;SET TCB STATUS TO ACTIVE-RUNNING, POP SAVED REGISTERS, AND
;RETURN TO NEW TASK.
;
;WHO MAY USE:
;       MTS ONLY
;
;INVOCATION:
;       JP      MPAT00
;
;USER STACK USAGE IN BYTES:
;       0
;
;SYSTEM STACK USAGE IN BYTES:
;       0
;
;T-STATES TAKEN:
;
;ENTRY REQUIREMENTS:
;       IFF=0=DISABLED
;       IX=NEW TCB ID
;
;RETURN CONDITIONS:
;       NO RETURN
;
MPAT00:
        LD      (MORTID),IX      ;MAINTAIN TCB ID IN MEMORY TOO.
        LD      L,(IX+MPTCSP)
        LD      H,(IX+MPTCSP+1) ;HL=NEW TCB'S SP.
        LD      SP,HL            ;RESTORE NEW TCB'S SP.
        LD      B,(IX+MPTCET)    ;B=EVENT TYPE.
        LD      C,(IX+MPTCEN)    ;C=EVENT #.
        LD      (IX+MPTCST),MPTCAR      ;TCB STATUS=ACTIVE-RUNNING.
        POP     IY               ;RESTORE NEW TASK'S REGISTERS.
        POP     IX
        POP     HL
        EI
        RET                      ;RETURN TO NEW TASK.
        ENDC                     ;END MTS CONDITIONAL.
```

VIKER PROCESSOR MANAGEMENT

```
;*************************************************
;
;       COMMON PRIMITIVE EXIT
;
;*************************************************
;
;THIS ROUTINE WILL INTERROGATE THE MEMORY BASED IFF
;TO DETERMINE TASK OF ISR LEVEL.
;IF ISR LEVEL, IT WILL RETURN WITH INTS. DISABLED.
;IF TASK LEVEL, IF WILL RETURN WITH INTS. ENABLED.
;
;WHO MAY USE:
;       VIKER ONLY
;
;INVOCATION:
;       JP      MPXT00
;
;USER STACK USAGE IN BYTES:
;       0
;
```

```
;SYSTEM STACK USAGE IN BYTES:
;       0
;
;T-STATES TAKEN:
;       28:DI, IF ISR.
;       36:DI, IF TASK.
;
;ENTRY REQUIREMENTS:
;       IFF=0=DISABLED
;       (SP)=USER'S RETURN ADDRESS
;
;RETURN CONDITIONS:
;       NO RETURN
;
MPXTOD:
        LD      A,(MDMIFF)      ;A=MEMORY BASED IFF.
        OR      A
        RET     PO              ;RET, IF ISR LEVEL.
        EI
        RET                     ;RET, IF TASK LEVEL.

   VIKER PROCESSOR MANAGEMENT

;***********************************************
;
;       LOCATE ECB
;
;***********************************************
;
;CALCULATE THE ADDRESS OF THE SPECIFIED ECB.
;
;WHO MAY USE:
;       VIKER ONLY
;
;INVOCATION:
;       CALL    MPLE00
;
;USER STACK USAGE IN BYTES:
;       0
;
;SYSTEM STACK USAGE IN BYTES:
;       0
;
;T-STATES TAKEN:
;       141:DI, IF SEMAPHORE
;       159:DI, IF MSG. XCHG.
;       173:DI, IF TIMER.
;
;ENTRY REQUIREMENTS:
;       IFF=0=DISABLED
;       B=EVENT TYPE
;       C=EVENT #
;       IY=TCB ID
;
;RETURN CONDITIONS:
;       HL=ECB ADDR OF DESIRED ECB
;       SAVED=BC,DE,IX,IY,IFF,PR'S
;       ALTERED=AF
;
MPLE00:
        LD      L,(IX+MPTCEP)
        LD      H,(IX+MPTCEP+1) ;HL=PTR TO ECB PTR TABLE.
        LD      A,B             ;A=EVENT TYPE.
        OFF     A,0-MPECFS.SHR.MPECBT   ;DEC TO ZERO, IF SEMAPHORE.
        JR      Z,MPLE10        ;JUMP, IF SEMA. TYPE.
;
        OFF     A,0-(MPECFX-MPECFS).SHR.MPECBT  ;DEC TO ZERO, IF XCHG.
        LD      A,(HL)          ;A=# OF SEMAPHORES.
        JR      Z,MPLE10        ;JUMP, IF XCHG TYPE.
;
```

```
        OFF     HL,MPTCNX-MPTCNS          ;HL=PTR TO # OF XCHG'S.
        ADD     A,(HL)            ;A=# OF SEMA'S PLUS # OF XCHG'S.
        JR      MPLE20            ;JUMP, IF TIMER TYPE.
;
MPLE10:
        OFF     HL,MPTCNX-MPTCNS          ;HL=PTR TO # OF XCHG'S.
MPLE20:

   VIKER PROCESSOR MANAGEMENT

        OFF     HL,MPTCNE-MPTCNX          ;HL=PTR TO TOTAL # OF ECB'S.
        ADD     A,C               ;A=# OF ECB PTR'S TO SKIP.
        COND    MPCADB            ;IF DEBUG-
        ENDC
        OFF     HL,MPTCFP-MPTCNE          ;HL=PTR TO FIRST ECB PTR.
        ADD     A,A               ;A=OFFSET IN PTR TABLE.
        ADD     A,L               ;ADD OFFSET TO START OF TABLE.
        LD      L,A               ;L=LO BYTE OF PTR TO PTR.
        LD      A,0
        ADC     A,H
        LD      H,A               ;H=HO BYTE OF PTR TO PTR.
        LD      A,(HL)            ;A=LO BYTE OF PTR TO ECB.
        INC     HL
        LD      H,(HL)            ;H=HO BYTE OF PTR TO ECB.
        LD      L,A               ;HL=PTR TO VLI OF DESIRED ECB.
        OFF     HL,MPECEC-MPECVL          ;HL=PTR TO ECF OF DESIRED ECB.
        COND    MPCADB            ;IF DEBUG-
        ENDC
        RET
;***************************************************
;
;       PARSE EVENT CONTROL FLAG
;
;***************************************************
;
;SEPARATE EVENT TYPE AND # FROM ECF AND RETURN IN
;SEPARATE REGISTERS.
;
;WHO MAY USE:
;       VIKER ONLY
;
;INVOCATION:
;       CALL    MPPE00
;
;USER STACK USAGE IN BYTES:
;       0
;
;SYSTEM STACK USAGE IN BYTES:
;       0
;
;T-STATES TAKEN:
;       43:DI
;
;ENTRY REQUIREMENTS:
;       B=ECF
;
;RETURN CONDITIONS:
;       B=EVENT TYPE
;       C=EVENT #
;       SAVED=DE,HL,IX,IY,IFF,PR'S
;       ALTERED=AF
;
MPPE00:
        LD      A,B               ;A=ECF.
        AND     MPECMN
        LD      C,A               ;C=EVENT #.
        LD      A,B
        AND     MPECMT
        DUP     RLCA,8-MPECBT     ;RIGHT JUSTIFY EVENT TYPE.
        LD      B,A               ;B=EVENT TYPE.
        RET
```

Although the invention has been described in detail, it is to be clearly understood that the same is by way of illustration and example only and is not to be taken by way of limitation, the spirit and scope of the invention being limited only to the terms of the appended claims.

I claim:

1. Apparatus for controlling the completion of tasks used to control the operation of an automated teller machine (ATM), the ATM connected to a host processing device, comprising:

a plurality of peripheral devices interconnected as a part of the ATM, each of the peripheral devices including means for formatting transaction sequence event messages to initiate ATM transaction events using the peripheral devices;

ATM control means connected between said ATM and said host processing device for scheduling ATM transaction events such that the peripheral devices perform at least two ATM transaction events simultaneously in real-time, the ATM control means including a first task scheduling control means for controlling the completion of tasks initiated by said ATM control means on a prioritized basis; and interface control means connected to said ATM control means and the plurality of peripheral devices for receiving and processing the transaction sequence event messages to initiate simultaneous real-time performance of the ATM transaction events by the peripheral devices, the interface control means including a second task scheduling means for controlling the completion of tasks initiated by said interface control means on a non-prioritized basis.

2. Apparatus for controlling the completion of tasks as described in claim 1 wherein said ATM control means includes means for generating transaction event sequence messages for requesting operation of said peripheral devices.

3. Apparatus for controlling the completion of tasks as described in claim 2 wherein said first task scheduling control means includes means for transferring said transaction sequence event messages between tasks initiated by said ATM control means.

4. Apparatus for controlling the completion of tasks as described in claim 2 wherein said second task scheduling control means includes means for transferring said transaction sequence event messages between tasks initiated by said interface control means.

5. Apparatus for controlling the completion of tasks as described in claim 2 wherein said first and second task scheduling control means include means for transferring messages between communications protocol handler tasks of said ATM control means and said interface control means.

6. Apparatus for controlling the completion tasks as described in claim 1 wherein said ATM control means includes one or more queues, each of said queues having a priority level associated therewith.

7. Apparatus for controlling the completion tasks as described in claim 6 wherein said first task scheduling control means includes means for queueing tasks to an appropriate queue based on the priority of said task.

8. Apparatus for controlling the completion tasks as described in claim 7 wherein said ATM control means includes a processor and memory for processing tasks on a first-in, first-out basis for each of said queues, starting with the highest priority queue.

9. Apparatus for controlling the completion of tasks as described in claim 8 wherein said first task scheduling control means includes means for suspending the processing of a current task to form a suspended task.

10. Apparatus for controlling the completion of tasks as described in claim 9 wherein said first task scheduling control means further includes means for reactivating said suspended task upon the occurrence of an event.

11. Apparatus for controlling the completion of tasks as described in claim 10 wherein said event is a reception of a transaction sequence event message, the expiration of a timer, or the signaling of a semaphore.

12. Apparatus for controlling the completion of tasks as described in claim 1 wherein said interface control means includes a queue for storing tasks to be run by said interface control means.

13. Apparatus for controlling the completion of tasks as described in claim 12 wherein said second task scheduling control means includes means for queueing tasks to said queue on a first-in, first-out basis.

14. Apparatus for controlling the completion of tasks as described in claim 13 wherein said second task scheduling control means includes means for suspending the processing of a current task to form a suspended task.

15. Apparatus for controlling the completion of tasks as described in claim 14 wherein said second task scheduling control means further includes means for reactivating said suspended task upon the occurrence of an event.

16. A method for controlling the completion of tasks used to control the operation of an automated teller machine (ATM), the ATM being connected to a host processing device and having a plurality of peripheral devices interconnected thereto, comprising the steps of:

formatting transaction sequence event messages for initiating ATM transaction events using the peripheral devices;

scheduling the ATM transaction events in an ATM control means connected between the ATM and the host processing device, the ATM control means including a first task scheduling control means for controlling the completion of tasks initiated by the ATM control means on a prioritized basis; and processing the transaction sequence event messages in an interface control means connected to the ATM control means and the plurality of peripheral devices to thereby initiate simultaneous real-time performance of the ATM transaction events by the peripheral devices, the interface control means including a second task scheduling means for controlling the completion of tasks initiated by the interface control means on a non-prioritized basis.

* * * * *